(12) United States Patent
Carnahan et al.

(10) Patent No.: US 11,954,797 B2
(45) Date of Patent: Apr. 9, 2024

(54) SYSTEMS AND METHODS FOR ENHANCED BASE MAP GENERATION

(71) Applicant: State Farm Mutual Automobile Insurance Company, Bloomington, IL (US)

(72) Inventors: Jeremy Carnahan, Normal, IL (US); Michael Stine McGraw, Bloomington, IL (US); John Andrew Schirano, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/058,642

(22) Filed: Nov. 23, 2022

(65) Prior Publication Data

US 2023/0087702 A1  Mar. 23, 2023

Related U.S. Application Data

(63) Continuation of application No. 17/083,850, filed on Oct. 29, 2020, now Pat. No. 11,512,955, which is a
(Continued)

(51) Int. Cl.
*G01C 11/06* (2006.01)
*G06F 16/29* (2019.01)
(Continued)

(52) U.S. Cl.
CPC .............. *G06T 17/05* (2013.01); *G01C 11/06* (2013.01); *G06F 16/29* (2019.01); *G06T 7/55* (2017.01);
(Continued)

(58) Field of Classification Search
CPC .. G06T 17/05; G06T 7/55; G06T 7/70; G06T 2207/10028; G06T 2207/30256;
(Continued)

(56) References Cited

U.S. PATENT DOCUMENTS

| 6,278,460 B1 | 8/2001 | Myers |
| 7,164,883 B2 | 1/2007 | Rappaport |

(Continued)

FOREIGN PATENT DOCUMENTS

| DE | 102015203016 | * 8/2016 | ........... G05D 1/0272 |
| DE | 102018113344 | * 12/2019 | ............. G01C 11/04 |

(Continued)

OTHER PUBLICATIONS

"Drone with LIDAR Maps Tunnel for Self-Driving Cars", Web Article, Apr. 10, 2018, dronebelow, accessed online at URL: https://dronebelow.com/2018/04/10/drone-with-lidar-maps-tunnel-for-self-driving-cars/.

(Continued)

*Primary Examiner* — Jerome Grant, II
(74) *Attorney, Agent, or Firm* — Armstrong Teasdale LLP

(57) ABSTRACT

A feature mapping computer system configured to (i) receive a localized image including a photo depicting a driving environment and location data associated with the photo, (ii) identify, using an image recognition module, a roadway feature depicted in the photo, (iii) generate, using a photogrammetry module, a point cloud based upon the photo and the location data, wherein the point cloud comprises a set of data points representing the driving environment in a three dimensional ("3D") space, (iv) localize the point cloud by assigning a location to the point cloud based upon the location data, and (v) generate an enhanced base map that includes a roadway feature.

20 Claims, 11 Drawing Sheets

Related U.S. Application Data continuation of application No. 16/244,925, filed on Jan. 10, 2019, now Pat. No. 10,823,562.

(51) Int. Cl.

| | | |
|---|---|---|
| *G06T 7/55* | (2017.01) | |
| *G06T 7/70* | (2017.01) | |
| *G06T 17/05* | (2011.01) | |
| *G06V 10/44* | (2022.01) | |
| *G06V 10/764* | (2022.01) | |
| *G06V 20/13* | (2022.01) | |
| *G06V 20/17* | (2022.01) | |
| *G06V 20/56* | (2022.01) | |

(52) U.S. Cl.
CPC .............. *G06T 7/70* (2017.01); *G06V 10/454* (2022.01); *G06V 10/764* (2022.01); *G06V 20/13* (2022.01); *G06V 20/17* (2022.01); *G06V 20/56* (2022.01); *G06V 20/588* (2022.01); *G06T 2207/10028* (2013.01); *G06T 2207/30256* (2013.01)

(58) Field of Classification Search
CPC .... G01C 11/06; G01C 11/02; G01C 21/3602; G01C 21/3804; G06F 16/29; G06V 10/454; G06V 10/764; G06V 20/13; G06V 20/17; G06V 20/56; G06V 20/588
USPC .................................................. 382/181, 18
See application file for complete search history.

(56) References Cited

U.S. PATENT DOCUMENTS

| | | | |
|---|---|---|---|
| 7,509,241 | B2 | 3/2009 | Guo |
| 8,126,642 | B2 | 2/2012 | Trepagnier |
| 8,224,097 | B2 | 7/2012 | Matei |
| 8,260,482 | B1 | 9/2012 | Szybalski |
| 8,352,112 | B2 | 1/2013 | Mudalige |
| 8,818,076 | B2 | 8/2014 | Shenkar |
| 9,026,303 | B1 | 5/2015 | Ferguson |
| 9,094,673 | B2 | 7/2015 | Lundberg |
| 9,103,671 | B1 | 8/2015 | Breed |
| 9,150,220 | B2 | 10/2015 | Clarke |
| 9,245,345 | B2 | 1/2016 | Wang |
| 9,355,495 | B2 | 5/2016 | Miller |
| 9,460,517 | B2 | 10/2016 | Fathi |
| 9,613,388 | B2 | 4/2017 | Loss |
| 9,638,537 | B2 | 5/2017 | Abramson |
| 9,842,282 | B2 | 12/2017 | Liu |
| 9,866,881 | B2 | 1/2018 | Brav |
| 9,870,437 | B2 | 1/2018 | Pope |
| 9,877,009 | B2 | 1/2018 | Tran |
| 9,886,774 | B2 | 2/2018 | Fathi |
| 9,904,867 | B2 | 2/2018 | Fathi |
| 9,916,763 | B2 | 3/2018 | Jenkins |
| 9,937,795 | B2 | 4/2018 | Konet |
| 9,947,100 | B2 | 4/2018 | Moeglein |
| 9,953,540 | B2 | 4/2018 | MacFarlane |
| 9,975,632 | B2 | 5/2018 | Alegria |
| 10,013,507 | B2 | 7/2018 | Zhang |
| 10,082,798 | B2 | 9/2018 | Shashua |
| 10,086,699 | B2 | 10/2018 | Konet |
| 10,162,355 | B2 | 12/2018 | Hayon |
| 10,794,710 | B1 | 10/2020 | Liu |
| 10,823,562 | B1 | 11/2020 | Carnahan |
| 11,288,412 | B2 | 3/2022 | Golparvar-Fard |
| 2008/0112610 | A1 | 5/2008 | Israelsen |
| 2011/0254844 | A1 | 10/2011 | Hatakeda |
| 2015/0006117 | A1 | 1/2015 | Zhang |
| 2015/0025788 | A1 | 1/2015 | Crain |
| 2015/0081252 | A1 | 3/2015 | Loss |
| 2015/0109415 | A1 | 4/2015 | Son |
| 2015/0127239 | A1 | 5/2015 | Breed |
| 2016/0016663 | A1 | 1/2016 | Stanek | |
| 2016/0371984 | A1 | 12/2016 | MacFarlane | |
| 2017/0098131 | A1 | 4/2017 | Shashua | |
| 2017/0154463 | A1 | 6/2017 | von Cramon | |
| 2017/0178352 | A1 | 6/2017 | Harmsen | |
| 2017/0277951 | A1 | 9/2017 | Wagner | |
| 2017/0316573 | A1 | 11/2017 | Vicenzotti | |
| 2018/0025632 | A1 | 1/2018 | Breed | |
| 2018/0032088 | A1 | 2/2018 | van Cruyningen | |
| 2018/0075648 | A1 | 3/2018 | Moghadam | |
| 2018/0093676 | A1 | 4/2018 | Emura | |
| 2018/0158235 | A1 | 6/2018 | Wu | |
| 2018/0285665 | A1 | 10/2018 | Paszkowicz | |
| 2018/0354489 | A1 | 12/2018 | Stayton | |
| 2020/0111222 | A1 | 4/2020 | Asmari | |
| 2020/0134311 | A1* | 4/2020 | Pojman ............... G06V 30/422 |
| 2020/0134844 | A1* | 4/2020 | Mittal ..................... B60R 11/04 |
| 2020/0134853 | A1* | 4/2020 | Milici ........................ G06T 7/80 |
| 2020/0167603 | A1* | 5/2020 | Ung .................... G06F 18/2148 |
| 2020/0167941 | A1 | 5/2020 | Tong | |
| 2020/0167956 | A1 | 5/2020 | Herman | |
| 2020/0193183 | A1 | 6/2020 | Watanabe | |
| 2020/0202573 | A1* | 6/2020 | O'Hara ..................... G06T 7/90 |
| 2020/0242330 | A1 | 7/2020 | Blondel | |

FOREIGN PATENT DOCUMENTS

| | | | | |
|---|---|---|---|---|
| GB | 2457215 | A | | 8/2009 |
| WO | 2002101340 | A2 | | 12/2002 |
| WO | 2009003529 | A1 | | 1/2009 |
| WO | WO2016135856 | | * | 9/2016 ............ G01B 11/00 |
| WO | 2017120595 | A2 | | 7/2017 |
| WO | 2018015754 | A1 | | 1/2018 |
| WO | 2018017793 | A1 | | 1/2018 |
| WO | WO2018017793 | | * | 1/2018 ............... B60N 2/00 |
| WO | 2018061010 | A1 | | 4/2018 |
| WO | 2018104563 | A2 | | 6/2018 |
| WO | WO2018104563 | | * | 6/2018 ............. G01C 21/32 |

OTHER PUBLICATIONS

"From maintenance to management: drone-mapping hits the road", Mar. 22, 2018, PIX4D, accessed online at URL: https://www.pix4d.com/blog/from-maintenance-to-management-drone-mapping-hits-the-road.

"Lidar", Wikipedia Article, archived on Jan. 12, 2019 at URL: https://web.archive.org/web/20190112080202/https://en.wikipedia.org/wiki/Lidar.

"Ivl5", Webpage, archived on Nov. 24, 2018 at URL: https://web.archive.org/web/20181124203040/https://Ivl5.ai/.

"Management not maintenance: drone-mapping hits the road", Mar. 21, 2018, PIX4D, accessed online at URL: https://www.pix4d.com/blog/from-maintenance-to-management-drone-mapping-hits-the-road.

"Mapper", Webpage, archived online on Nov. 3, 2018 at URL: https://web.archive.org/web/20181103082213/https://www.mapper.ai/.

"Photogrammetry and Point Clouds", Webpage GIM International, Jan. 2016, accessed online at URL: https://www gim-international.com/themes/photogrammetry-point-clouds.

"Photogrammetry", Wikipedia Article, archived on Jan. 7, 2019 at URL: https://web.archive.org/web/20190107073113/https://en.wikipedia.org/wiki/Photogrammetry.

"Point cloud", Wikipedia Article, archived on Oct. 5, 2018 at URL: https://web.archive.org/web/20181005235329/https://en.wikipedia.org/wiki/Point_cloud.

"Precision Mapping and 3D Surface Modeling with Drone Photogrammetry", I-Map Data Systems, retrieved online on Jun. 15, 2018 at URL: http://www.i-maps.com/photogrammetry.htm.

"Real-time kinematic positioning", Wikipedia Article, archived on Apr. 27, 2021 at URL: https://web.archive.org/web/20210427182057/https://en.wikipedia.org/wiki/Real-time_kinematic_positioning.

"The Benefits of Using Point Cloud Data in Laser Scanning", Web Article, published Aug. 18, 2017, EDOXX, archived on Sep. 29, 2020 at URL: https://web.archive.org/web/20200929030743/https://

(56) References Cited

OTHER PUBLICATIONS www.edoxx.com/single-post/2017/08/17/The-Benefits-of-Using-Point-Cloud-Data-in-Laser-Scanning.
"To PPK or to RTK, is that the question?", Webpage, Position Partners, dated Dec. 5, 2016, archived on Oct. 26, 2020 at URL: https://web.archive.org/web/20201026003026/https://www.positionpartners.com.au/position-partners/to-ppk-or-to-rtk-is-that-the-question/.
Drones Made Easy, "Mapping with Drones", Webpage, Kickstarter, Oct. 22, 2014, accessed online at URL: https://www.kickstarter.com/projects/1950977397/mapping-with-drones.
Eliot, "Simultaneous Localization and Mapping (SLAM) for AI Self-Driving Cars", Web Article, published Dec. 1, 2017, archived on Oct. 30, 2020 at URL: https://web.archive.org/web/20201030223950/https://www.aitrends.com/ai-insider/simultaneous-localization-mapping-slam-ai-self-driving-cars/.
France-Presse, "Ford Studies Drone Use to Guide Self-Driving Cars", Web Article, Dec. 16, 2016, IndustryWeek, accessed online at URL: https://www.industryweek.com/technology-and-iiot/automation/article/22007027/ford-studies-drone-use-to-guide-selfdriving-cars.
Geo Week News Staff, "Drone LiDAR vs Photogrammetry: A Technical Guide", Web Article, Aug. 31, 2016, Geo Week News, accessed online at URL: https://www.geoweeknews.com/news/drone-lidar-vs-photogrammetry-technical-guide.
Hook, "Driverless cars: mapping the trouble ahead", Web Article, Feb. 20, 2018, accessed online at URL: https://www.ft.com/content/2a8941a4-1625-11e8-9e9c-25c814761640.
Komissarov, "Future of Maps: Self Driving Cars, Satellites & UAVs, Crowdsourcing", Web Article, Mar. 20, 2016, Medium, accessed online at URL: https://medium.com/@V.K.Komissarov/future-of-maps-self-driving-cars-satellites-uavs-crowdsourcing-be1c9795bc8b.
Levy, "Your Next Gig: Map the Streets for Self-Driving Cars", Web Article, Oct. 11, 2017, Wired, accessed online at URL: https://www.wired.com/story/your-next-gig-map-the-streets-for-self-driving-cars/.
Margaritoff, "Drones Could Help Self-Driving Vehicles Navigate More Safely", Web Article, Mar. 2, 2018, The Drive, accessed online at URL: https://www.thedrive.com/tech/18946/drones-could-help-self-driving-vehicles-navigate-more-safely.
Pesyna et al., "Accuracy in the Palm of Your Hand", Web Article, Feb. 2, 2015, GPS World, accessed online at URL: https://www.gpsworld.com/accuracy-in-the-palm-of-your-hand/.
Reese, "Updated: Autonomous driving levels 0 to 5: Understanding the differences", Web Article, Jan. 20, 2016, TechRepublic, accessed online at URL: https://www.techrepublic.com/article/autonomous-driving-levels-0-to-5-understanding-the-differences/.

\* cited by examiner

SYSTEMS AND METHODS FOR ENHANCED BASE MAP GENERATION

CROSS-REFERENCE TO RELATED APPLICATIONS

This application is a continuation of, and claims the benefit of, U.S. patent application Ser. No. 17/083,850, filed Oct. 29, 2020 and entitled "Systems and Methods for Enhanced Base Map Generation," which is a continuation of U.S. patent application Ser. No. 16/244,925, filed Jan. 10, 2019 and entitled "Systems and Methods for Enhanced Base Map Generation," and issued as U.S. Pat. No. 10,823,562 on Nov. 3, 2020, the contents of which are hereby incorporated herein by reference in their entirety and for all purposes.

FIELD OF THE DISCLOSURE

The present disclosure relates to base maps for autonomous vehicles and, more particularly, to a system and method for utilizing photogrammetry and image recognition to generate enhanced base maps from high-resolution aerial-photographs.

BACKGROUND

An autonomous vehicle (AV), also known as a "self-driving car", is a vehicle that is capable of operating automatically without human input. AVs may operate at varying levels of autonomy, such as through a relatively low-level-autonomy system, sometimes referred to as an advanced driver-assistance system (ADAS) which is currently utilized in the automotive industry, or a high-level-autonomy system, sometimes referred to as an automatic-driving system (ADS) which is utilized in "self-driving" vehicles. While AV technology is advancing rapidly, developing a fully autonomous vehicle is an interdisciplinary challenge that requires further advancement in a number of related technologies.

A key concept in AV operation is a process known as localization. Essentially, localization is the process by which an autonomous vehicle system (AV system) determines where it is in the world and/or where it is relative to objects in the surrounding environment. There are a number of techniques for localizing an AV, and an AV system may employ a number of techniques simultaneously in order to effectively localize the AV. One of the most well-known methods for localizing a vehicle involves the use of a Global Navigation Satellite System (GNSS), such as the Global Positioning System (GPS). However, while GPS is effective for mapping routes for human-operated vehicles, it's not accurate enough for localizing a vehicle during autonomous operation. For an AV, even a few feet of inaccuracy in localization could be the difference between safely avoiding and crashing into an obstacle on the side of the road. Effective AV operation, then, requires additional localization technologies.

One way to improve AV localization is through the use of base maps, also known as "HD maps", as a map-based reference for localizing AVs. Base maps contain accurate positioning coordinates for objects in an area, often placing objects within 10 cm (centimeters) of accuracy. AV systems commonly utilize base maps in two different ways: First, base maps can be used to directly assist in localization. For example, an AV loaded with a base map may detect an object in the environment, such as by using sensors like radar or LIDAR, and an AV system may compare the detected object to objects in the base map, thereby localizing the AV based upon its relative position to the detected object. Second, base maps can be used to increase the processing capacity available for an AV system to monitor dynamic features of the surrounding environment. For example, an AV system scanning a driving environment with a LIDAR sensor may determine that certain objects are already represented in a base map, and may therefore reduce the processing capacity assigned to monitoring the known objects.

Therefore, high quality base maps are important for effective AV operation, and techniques for developing more effective base maps are desirable. Currently, base maps may be generated using data collected by a vehicle equipped with LIDAR scanning technology or other image gathering technologies. However, current base map generation techniques possess a number of limitations. LIDAR scanning technology, for example, provides no means for collecting data related to colors of the surrounding environment or words on street signs. Further, collecting data via a fleet of cars presents limitations related to ground-based data collection. Cars, for example, are limited to specific paths and are limited by traffic conditions. Based upon the current limitations in base map generation, there is a need for both higher quality base maps and improved techniques for collecting map data more effectively.

BRIEF SUMMARY

The present embodiments may relate to systems and methods for generating enhanced base maps for autonomous vehicles. The system may include a feature mapping ("FM") computer device, one or more autonomous vehicles, one or more drones equipped with an image capturing device, and/or one or more databases.

In one aspect, a feature mapping computer system for generating an enhanced base map is provided. The feature mapping computer system includes a processor in communication with at least one memory device. The processor is configured to: (i) receive a first localized image including a first photo depicting a driving environment, a first camera angle describing the camera orientation at which the first photo was captured, and a first location associated with the first photo; (ii) receive a second localized image including a second photo depicting the driving environment, a second camera angle describing the camera orientation at which the second photo was captured, and a second location associated with the second photo, wherein the second location is different from the first location; (iii) identify, using an image recognition module, a roadway feature depicted in both the first and second photos; (iv) generate, using a photogrammetry module, a point cloud based upon the first and second photos, the first and second camera angles, and the first and second locations, wherein the point cloud comprises a set of data points representing the driving environment in a three dimensional ("3D") space; (v) generate a localized point cloud by assigning a location to the point cloud based upon at least one of the first and second locations; and (vi) generate an enhanced base map that includes a roadway feature by embedding an indication of the identified roadway feature onto the localized point cloud.

In another aspect, a computer implemented method for generating an enhanced base map is provided. The method may be implemented by a computer system including at least one processor. The method includes: (i) receiving a first localized image including a first photo depicting a driving environment, a first camera angle describing the camera orientation at which the first photo was captured, and a first location associated with the first photo; (ii) receiving a second localized image including a second photo depicting the driving environment, a second camera angle describing the camera orientation at which the second photo was captured, and a second location associated with the second photo, wherein the second location is different from the first location; (iii) identifying, using an image recognition module, a roadway feature depicted in both the first and second photos; (iv) generating, using a photogrammetry module, a point cloud based upon the first and second photos, the first and second camera angles, and the first and second locations, wherein the point cloud comprises a set of data points representing the driving environment in a three dimensional ("3D") space; (v) generating a localized point cloud by assigning a location to the point cloud based upon at least one of the first and second locations; and (vi) generating an enhanced base map that includes a roadway feature by embedding an indication of the identified roadway feature onto the localized point cloud.

In another aspect, at least one non-transitory computer-readable storage media having computer-executable instructions embodied thereon for generating an enhanced base map is provided. When executed by at least one processor, the computer-executable instructions cause the processor to: (i) receive a first localized image including a first photo depicting a driving environment, a first camera angle describing the camera orientation at which the first photo was captured, and a first location associated with the first photo; (ii) receive a second localized image including a second photo depicting the driving environment, a second camera angle describing the camera orientation at which the second photo was captured, and a second location associated with the second photo, wherein the second location is different from the first location; (iii) identify, using an image recognition module, a roadway feature depicted in both the first and second photos; (iv) generate, using a photogrammetry module, a point cloud based upon the first and second photos, the first and second camera angles, and the first and second locations, wherein the point cloud comprises a set of data points representing the driving environment in a three dimensional ("3D") space; (v) generate a localized point cloud by assigning a location to the point cloud based upon at least one of the first and second locations; and (vi) generate an enhanced base map that includes a roadway feature by embedding an indication of the identified roadway feature onto the localized point cloud.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
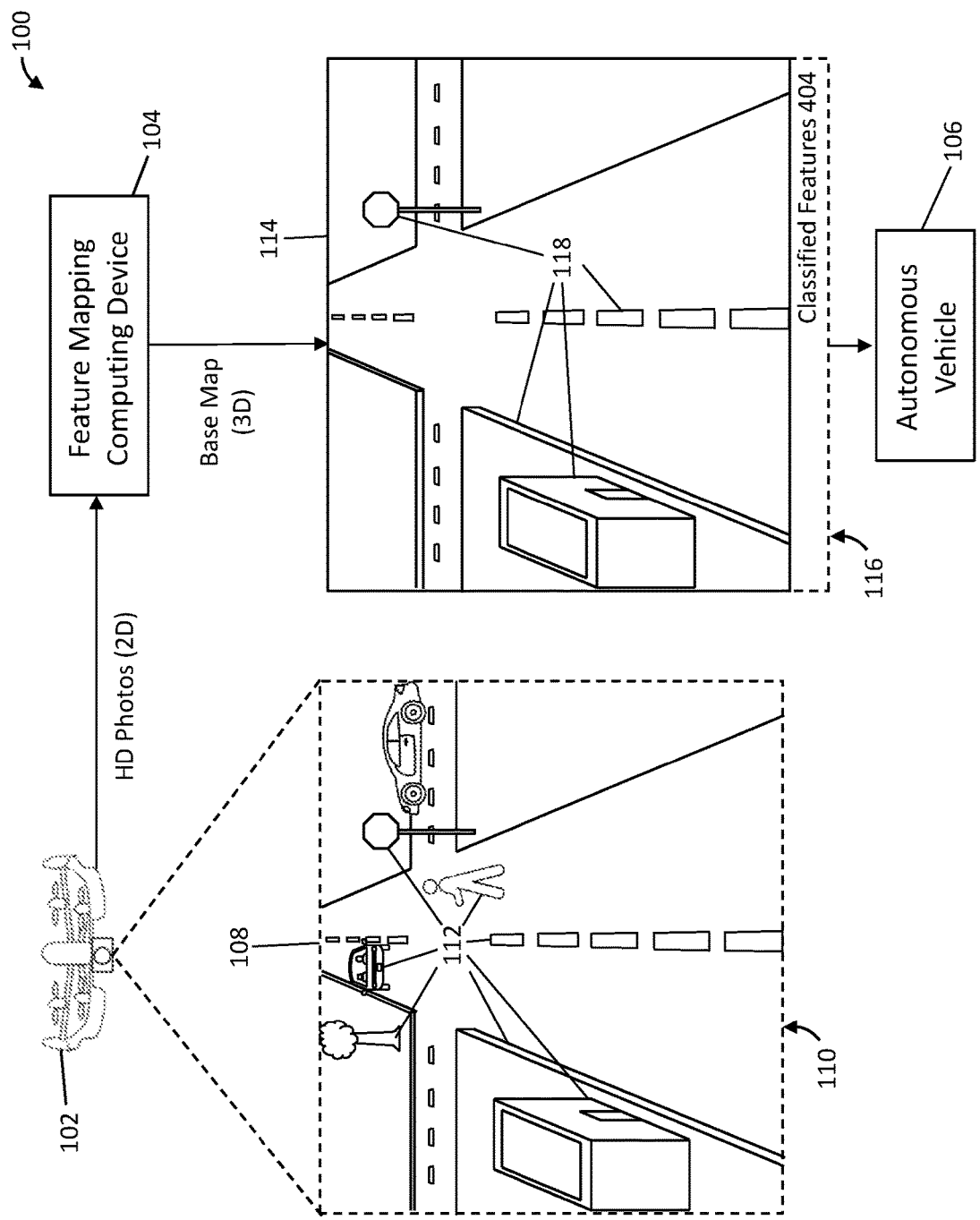
FIG. 1 illustrates an exemplary mapping system in accordance with an exemplary embodiment of the present disclosure.

The Figures depict preferred embodiments for purposes of illustration only. One skilled in the art will readily recognize from the following discussion that alternative embodiments of the systems and methods illustrated herein may be employed without departing from the principles of the disclosure described herein.

DETAILED DESCRIPTION OF THE DRAWINGS

The present embodiments may relate to, inter alia, systems and methods for developing an enhanced base map used in autonomous vehicle operation. In one exemplary embodiment, the process may be performed by a feature mapping ("FM") computer device.

Localization and Autonomous Vehicle Operation

An autonomous vehicle (AV) is a vehicle capable of operating, in some capacity, without human input. An integral component of AV operation is the concept of localization, which involves determining the location of the AV in relation to its environment and/or a larger-scale map. Localization is critical for both AV operation and navigation, and one technique for improving localization is the use of a base map in AV operation. A base map is a machine readable map which depicts a driving environment and provides a foundational map which an AV references during operation. Base maps are crucial for AV operation, and an accurate base map increases the safety and effectiveness of AV operation systems.

Autonomous vehicle (AV) systems can be classified based upon the level of autonomy of which they are capable. The classification system developed by SAE International, for example, classifies AV systems from Level 0 to Level 5, where Level 0 represents a low level of autonomy, and Level 5 represents a fully autonomous vehicle. Further, AV operation systems may be categorized generally into two categories based upon the level of autonomy. Systems with low-level autonomy, such as advanced-driver assistance systems (ADAS), are systems which allow the AV to assist the driver in a certain driving operation. For example, an AV operation feature which assists a driver in parallel parking may be classified as an ADAS. Alternatively, systems with high-level autonomy, such as automatic-driving systems (ADS), allow for completely autonomous control of certain aspects of driving. For example, an AV feature which allows a driver to take full attention off the road while the AV drives to a set destination may be classified as an ADS. As used herein, autonomous vehicle (AV) refers to an AV (either having low-level-autonomy, high-level-autonomy, or something in between) and/or any components or elements which make up an AV, such as an AV operating system, navigation system, central processor, sensors, and other systems which may be components of an AV.

A key concept associated with AV systems is "localization". Localization refers to the process of determining the absolute location of an AV relative to a larger scale map and/or its location relative to objects in its environment. Herein, absolute localization refers to localizing an object relative to a large scale map and/or Earth (e.g., determining the latitude and longitude of an object), while relative localization refers to the localization of an object relative to objects in its surrounding environment (e.g., determining how far an AV is from a nearby fire hydrant).

Effective localization plays a critical role not only in AV operation, but also in developing machine-readable base maps which are used to assist AV operation. Base maps, also known as HD maps, are machine readable maps which accurately represent a driving environment in a 3D space (e.g., a geographical area and the objects in that area) and allow for enhanced AV operation. In other words, a base map comprises a 3D representation of a driving environment that an AV references to improve navigation and operation. In some embodiments, a geographical area may be mapped, objects and features within the area may be identified, and the objects and features may be localized within the map. In one embodiment, a mapping vehicle equipped with a camera may travel through an area of interest while the camera collects HD photos (e.g., high-resolution photos) of the driving environment. The mapping vehicle may establish its position using localization techniques, and each HD photo may be associated with the position of the vehicle at the time the HD photo was captured. Roadway features may be identified in the HD photos and localized based upon their positions relative to the mapping vehicle. By repeating the above process for all HD photos captured in a geographical area, a base map may be generated. Similar to localization in AV operation, localization for developing base maps may be achieved at different levels of accuracy. In one embodiment, a base map sufficient for fully autonomous operation of an AV contains roadway features positioned within 10 cm accuracy.

Localization also plays a critical role in AV operation in that an AV must be localized relative to its environment in order to safely and effectively operation. In one embodiment, an AV implements absolute localization techniques to determine its location within a geographical or map-defined area (e.g., its latitude and longitude). Absolute localization is used for AV navigation and routing, and accurate absolute localization allows an AV to localize itself relative to objects in the surrounding environment by referencing a base map. In another embodiment, an AV implements relative localization techniques to determine its location relative to objects in the surrounding environment (e.g., the distance between the AV and a nearby fire hydrant). Relative localization is key for AV operation, as understanding an AV's position relative to objects in the surrounding environment is key for safe and effective operation. For example, accurate relative localization may allow an AV to determine that it is positioned in the right lane of a road. In another example, localization may allow an AV to determine that it is approaching an intersection that has a stop sign and a fire hydrant on the corner, and the AV may further determine its velocity and position relative to the stop sign, fire hydrant, and intersection.

In some embodiments, an AV must be localized to within roughly 10 cm of accuracy in order to enable high levels of autonomy. Relative localization less accurate than 10 cm presents a safety risk, as the AV would not have an accurate representation of where it is in relation to other objects in its surrounding environment. For example, a 1 m level of accuracy may allow for a situation in which an AV determines that it is located in the middle one lane, when in reality, the AV is extending 0.5 m into an adjoining lane.

As used herein, "driving environment" refers to any paths which a vehicle may traverse and the surrounding environment, and includes, but is not limited to, city streets, highways, rural roads, dirt or gravel roads, and off road trails. As used herein, the term "roadway features" refers to objects and features of roadways, which includes but is not limited to roads, lane markings, buildings, street lights, street signs, fire hydrants, and curbs.

Localization Techniques

An AV may determine its location by utilizing at least one of a plurality of localization techniques. For example, localization techniques may be based upon the utilization of a global navigation satellite system (GNSS), a wide-area differential GNSS (WADGNSS), real-time kinematic (RTK) positioning, post-processing kinematic (PPK) positioning, an inertial measurement unit (IMU), or referencing a base map using LIDAR data or photos processed using photogrammetry techniques. In some embodiments, an AV may utilize a plurality of localization techniques in combination and may vary the localization techniques based upon the situation.

In some embodiments, AV localization techniques generally follow one of two processing schemes: absolute localization followed by relative localization, or relative localization followed by absolute localization. In the first scheme, absolute localization followed by relative localization, an AV localizes absolutely then references a base map to localize relative to roadway features in the driving environment. Specifically, an AV localizes absolutely, such as by using satellite-based or IMU-based localization techniques, references a base map which includes locations of objects in the surrounding driving environment, and localizes relative to those objects based upon the absolute location of the AV. For example, an AV may absolutely localize using RTK positioning then reference a base map to determine where it is in reference to lane markings. In the second scheme, relative localization followed by absolute localization, an AV localizes relative to roadway features in the driving environment then references a base map to localize absolutely. Specifically, an AV detects roadway features using sensors, determines its position relative to the roadway features, then determines its absolute location based upon the absolute locations of the roadway features in a base map. For example, an AV may use a camera to detect lane markings, determine its position relative to the lane markings using photogrammetry, then reference a base map to determine its absolute location. In this sense, base maps may be viewed as a tool for determining absolute localization based upon relative localization, and vice versa.

In one embodiment, the location of an AV may be determined using signals from a global navigation satellite system (GNSS). As used herein, GNSS refers to any or all of the GNSS satellite systems including but not limited to the United States GPS, Russian GLONASS, Chinese BeiDou, and the European Galileo systems. In one embodiment, an AV is equipped with a radio receiver that allows the AV to detect satellite signals broadcast by a GNSS. Signals received from multiple satellites are processed to determine the position of the AV using a technique similar to triangulation. GNSS localization is widely available and relatively easy to implement, however, it possesses a number of limitations.

As a first limitation, GNSS localization is only accurately to within roughly 3 meters. This level of accuracy is acceptable for GPS navigation systems which include a human driver, but it is not accurate enough for fully autonomous operation of an AV. As discussed, in some embodiments, AVs require localization accuracy within 10 cm. As a second limitation, GNSS localization requires a clear line-of-sight (LOS) between the AV's radio receiver and at least 3, and preferably 4, satellites. In some situations, an AV may enter an area in which an adequate LOS cannot be established with the required number of satellites. Such a loss in reception is referred to as a "dropout", and while the dropout conditions persist, GNSS localization cannot be established. For example, in a dense metropolitan area, tall buildings may obscure the LOS between an AV and a number of satellites. In a similar example, an AV traveling through a tunnel may lose LOS with all satellites. In both cases, the AV would be unable to utilize GNSS localization. As a third limitation, the nature of GNSS signals allows for the introduction of a 'multi-path' error. A multi-path error occurs when a satellite signal reflects off of objects in an environment, and the reflected signal is received by a radio receiver being used for GNSS localization. The reflected signal essentially travels an additional distance before reaching the receiver, and thus will be out of phase from a direct signal traveling to the receiver from the same satellite. This discrepancy introduces errors into GNSS localization which further reduce its accuracy. For the reasons above, GNSS localization alone is generally not accurate enough for high-level AV operation. In one embodiment, GNSS localization is utilized by an AV as a localization foundation which is further honed by additional localization techniques.

In another embodiment, the location of an AV may be determined using a wide-area differential GNSS (WADGNSS). A WADGNSS network essentially improves GNSS localization accuracy by referencing base stations and a low-earth orbit (LEO) satellite network. In one embodiment, base stations in a network receive GNSS satellite signals and utilize a mathematical model to determine a correction factor for satellite errors over a large area. The base stations transmit the correction factor to an LEO satellite, which then transmits the correction factor to an AV. In some embodiments, the AV is configured to apply the correction factor to a location determined using GNSS localization. WADGNSS localization may be accurate to within roughly 10 cm, and is thus represents a significant improvement in localization accuracy as compared to strictly GNSS localization. However, WADGNSS localization possesses a number of the same limitations as GNSS localization. Specifically, dropouts and multi-path errors are still a factor. Further, WADGNSS localization is only possible in an area where communication with a WADGNSS system is available.

In another embodiment, the location of an AV may be determined using real-time kinematic (RTK) positioning. Like WADGNSS localization, RTK positioning utilizes GNSS signals and a correction factor to localize accurately. Unlike WADGNSS localization, however, RTK positioning requires communication with a single base station for which a ground-truth location (e.g., a substantially exact location) is known. In an exemplary embodiment, an AV utilizing RTK localization includes a radio receiver for receiving GNSS signals and a wireless transceiver for communicating with a base station. Both the AV and the base station receive GNSS satellite signals and determine their respective locations based upon the GNSS signals. The base station compares its determined location to its known ground-truth location, and determines a correction factor for the GNSS signal. The base station transmits the correction factor to the AV, and the AV applies the correction factor to received GNSS signals to determine its RTK location. In some embodiments, the AV transmits its GNSS location to the base station, and the base station applies the correction factor and transmits the determined RTK location back to the AV.

Due to the direct communication between an AV and an RTK base station, RTK positioning is significantly more accurate that GNSS localization, achieving localization to within four centimeters. In some embodiments, RTK positioning allows an AV to determine its location to within one centimeter. However, RTK techniques possess a number of limitations. For example, an AV utilizing RTK localization is constrained by the need for access to a GNSS network, so dropouts and multi-path errors present challenges. Similarly, the AV must be able to communicate with the RTK base station, which requires additional equipment, such as an RTK compatible transceiver in addition to the radio receiver used for GNSS-based localization. Further, the transceiver must be able to communicate with the RTK base station. For example, in a dense urban environment the signal between an AV and an RTK base station may be interrupted by physical structures or may experience interference from other wireless communication signals. Similarly, RTK positioning is only effective within a limited range of an RTK base station. In some embodiments, an AV can effectively communicate with an RTK base station within a radius of up to 20 km. As an additional limitation, prior to utilizing an RTK base station for RTK localization, a fairly exact location of the base station must be established.

In another embodiment, the location of an AV may be determined using post-processing kinematics (PPK). Similar to RTK localization, PPK localization involves determining a correction factor based upon the comparison of the ground-truth location of a base station to a GNSS-based location. Unlike RTK localization, however, the correction factor is not applied to the GNSS-based location of an AV in real-time. Rather, in some embodiments, an AV determines its GNSS-based location at numerous points on a trip, assigns a timestamp to each location point, and stores the timestamped location points on a local storage system. Similarly, a base station determines its GNSS-based location at numerous points in time, compares the GNSS-based location to the ground-truth location of the base station to determine an error correction factor for each recorded location point, and assigns a timestamp to each location point and error correction factor. The timestamped data is stored on a local storage system or on an external database. When the AV completes its trip, the timestamped AV location points are compared to the timestamped base station data pairs and a corresponding error correction factor is applied to each timestamped AV location point. The accuracy of the AV location data is significantly improved by applying the error correction factor, and the location of the AV can be determined for the entirety of the trip. In some embodiments, PPK localization can be used to determine the location of an AV to an accuracy of four centimeters. In some embodiments, PPK localization can be used to determine the location of an AV to an accuracy of one centimeter.

PPK localization, as the name implies, allows a vehicle's location to be determined after the vehicle has completed a trip. In some embodiments, a "trip" refers to any period of time during which an AV is not in wireless communication with an external network, such that data for multiple "trips" may refer to data which was collected at different points during a single pass from one location point to another. For example an AV may be traveling between two cities, and may experiencing alternating states of being connected to a wireless network and not being connected to a wireless network. During the time the AV is not connected to a wireless network, location data is timestamped and stored, and once the AV regains a wireless connection, the data is transmitted to a remote server and corrected based upon error correction factors determined by a nearby base station. In some embodiments, the AV may transmit timestamped location data for remote processing, while in other embodiments, the AV may receive the error correction factor from a database and perform the error corrections using a local processor.

PPK localization suffers from some similar limitations as RTK localization. Specifically, PPK localization requires connection with a GNSS network, and is therefore negatively affected by dropouts and multi-path errors. One advantage of PPK localization is that localization of the AV is not limited by a need for continuous connection to a base station. In some embodiments, an AV collects trip location data with no connection to a base station, and PPK localization is applied to the location data once the AV finishes the trip and transmits the location data to an external server for processing. Another advantage of PPK localization is that no additional equipment, such as an RTK-compatible transceiver, is needed. Yet another advantage of PPK localization is that in the case that there are gaps in location data, data recorded both before the data gap ("pre-gap" data) and after the data gap ("post-gap" data) can be used to interpolate the missing data. In the case of gaps in RTK location data, only pre-gap data can be used to interpolate the missing data, because, by definition, an RTK localization system is attempting to localize an AV in real time (e.g., without access to future data points). Despite a number of advantages when compared to RTK localization, PPK localization suffers from a significant limitation, namely, that it localizes after a trip has already occurred. PPK localization then, may be less useful for localization during AV operation compared to other localization techniques mentioned. In some embodiments, as discussed below, PPK localization is implemented in the creation of base maps, such that a vehicle captures images of a surrounding environment, and PPK localization is subsequently applied to determine the location of the vehicle at the time each photo was taken.

In another embodiment, the location of an AV may be determined using data obtained from an inertial measurement unit (IMU). An IMU is a device which measures both linear and angular acceleration using a combination of at least one accelerometer and at least one gyroscope. In some embodiments, an AV system uses data obtained from an IMU to determine the acceleration, velocity, and position of an AV. Once an accurate location of an AV has been determined, data from the IMU is used to maintain accurate localization. Using velocity and acceleration measurements obtained from the IMU, an AV can determine its position accurately enough for fully autonomous performance. However, a drawback to IMUs is that they require frequent re-calibration in order to accurately determine the location of a vehicle. In the case that an AV is no longer able to localize itself using satellite based navigation, IMU data can be used to maintain accurate localization for a period of time. In some embodiments, data from an IMU allows localization accurate enough for autonomous operation for approximately two minutes without requiring recalibration.

In another embodiment, the location of an AV may be determined by detecting roadway features. An AV collects data on roadway features in the immediate environment of the AV, compares the roadway feature detection data to stored base maps, and determines its location based upon its relative position to the objects. In other words, an AV is localized relative to roadway features for which an absolute location is known. Based upon the relative position of the AV to the roadway features and the absolute location of the roadway features, the AV is localized absolutely. In one embodiment, an AV utilizes sonar, radar, LIDAR, or other similar technologies, which scan the environment and determine the location of nearby objects. In another embodiment, the AV includes cameras which capture images of the surrounding environment. The AV may process the images using object recognition and photogrammetry to identify objects and determine the AV's position relative to those objects. In one embodiment, an AV localizes within a lane by using LIDAR for curb recognition. The AV collects data using a LIDAR scanner and generates a point cloud which represents a curb. Based upon the point cloud, the AV determines where the vehicle is in relation to the curb and subsequently determines the AV's position in the lane. Similarly, in some embodiments an AV localizes within a lane using a camera to detect lane markings. The AV is equipped with 360 degree camera systems which allow the AV to collect image data of its surrounding environment. Image data containing lane markings is collected and analyzed using photogrammetry and/or image recognition, and the vehicle's position relative to the lane markings is determined, thereby localizing the vehicle within the lane.

Localization based upon roadway features may possess certain limitation, however. In general, absolute localization based upon roadway features may only be as accurate as the base map which the AV references. In some embodiments, the base map may be accurate to an accuracy required for autonomous vehicle operation. For example, the base map may represent objects and features to within 10 cm of accuracy. However, in some embodiments, a base map for a certain area may not contain roadway feature locations accurate enough to enable absolute localization of an AV. In another embodiment, a base map may not contain enough objects or features to determine vehicle localization. For example, a rural area may contain few obvious features, landmarks, or objects, and a comparison of object detection data and the base map may not contain enough information to determine absolute vehicle location. In such embodiments, the AV may still be able to achieve relative localization accurate enough to enable AV operation, but a lack of absolute localization may hinder navigation systems and may increase the amount of processing power necessary for implementing simultaneous localization and mapping (SLAM) (described in more detail below). Further, in some embodiments, environmental conditions may reduce the effectiveness of object detection sensors. Heavy fog, for example, may reduce the ability of a LIDAR scanner to detect objects in the environment. Similarly, it may be difficult for a camera to capture pictures of distant objects at night when lighting conditions are poor.

In another embodiment, the location of an AV may be determined using simultaneous localization and mapping (SLAM). SLAM generally refers to the real-time localization of an AV relative to objects in the AV's driving environment and simultaneous mapping of the environment based upon data collected from the driving environment. SLAM techniques are especially useful for localization relative to unmapped and/or dynamic roadway features as opposed to mapped and/or static roadway features. Specifically, unmapped roadway features may include roadway features that are not included in a base map utilized by an AV (e.g., recently erected buildings or construction barriers, barriers for temporary events, pedestrians, bikers, and vehicles). Mapped roadway features may be roadway features which are included in a base map utilized by an AV (e.g., buildings, roadway signs, stoplights, curbs, lane markings, and trees).

In some embodiments an AV may utilize sensors such as radar, sonar, LIDAR, and cameras to detect roadway features in the driving environment and creates a map of these objects. In one embodiment, the AV may sense and map unmapped, static roadway features (e.g., buildings, street signs, lane markings, curbs, trees, or construction barriers). The AV is then able to localize relative to these features using localization techniques which localize the AV absolutely (e.g., which localize the AV relative to the base map). In another embodiment, the AV senses unmapped, dynamic roadway features (e.g., vehicles, bicycles, pedestrians, or animals) and utilizes real-time relative localization to safely navigate through the driving environment.

In some embodiments, an AV may use SLAM techniques specifically to account for unmapped roadway features. Specifically, the AV may utilize at least one non-SLAM localization technique for localizing relative to mapped roadway features, and utilizes SLAM techniques for navigating relative to unexpected roadway features. For example, an AV driving in a city may have access to an RTK base station and may have determined its location to within 10 cm. Further, the AV may have access to an accurate base map which maps the objects in the environment to within 10 cm. The AV, upon approaching a stoplight, may reference a base map and determine that the stoplight is approaching and where the stoplight is relative to the AV. However, in the case of an unmapped roadway feature, such as another vehicle on the road or a biker, the AV will not be able to reference the roadway feature in a base map. In such a case, the AV may utilize SLAM techniques to determine there is an unmapped roadway feature and determine how quickly and from what direction the object is approaching. In other words, the vehicle recognizes an object and simultaneously maps the object and localizes itself in relation to the object.

SLAM techniques require a large amount of processing resources. Driving conditions, especially in urban environments, are often replete with unexpected and/or dynamic roadway features which cannot be reliably mapped. In such cases, an AV's SLAM interface (e.g., sensors and processors implementing SLAM techniques) may be bombarded by incoming data. In some embodiments, however, an AV may reduce the resource intensity of SLAM processing by relying on base map data to localize relative to mapped roadway features. In other words, an absolutely localized AV is relatively localized to mapped roadway features in the driving environment, and these mapped roadway features are excluded from SLAM processing. For example, an AV may receive environment detection data which includes an approaching building, determine that the building is in its expected location by referencing a base map, and reduce the resources committed to monitoring the building with the SLAM techniques. In another example, an AV may receive environment detection data which includes a pedestrian walking on the sidewalk, determine that the pedestrian is not referenced in a base map, and commit more processing power to SLAM techniques monitoring the pedestrian.

In some embodiments, an AV may utilize at least one of a plurality of localization techniques. In some embodiments, an AV may utilize multiple localization techniques in combination, varying the localization techniques based upon a given situation. In some embodiments, the AV may utilize GNSS-based localization to determine an approximate location at the beginning of a trip; the AV continues to utilize GNSS-based localization whenever it's available and supplements the GNSS-based localization with other techniques such as environment-detection-based localization. In some embodiments, the AV may rely almost exclusively on SLAM to localize relative to a driving environment without localizing absolutely. In some embodiments, the AV may achieve accurate localization using RTK or WADGNSS localization, while simultaneously implementing SLAM techniques for monitoring unmapped and/or dynamic roadway features. In some embodiments, the AV may achieve reliable, high accuracy localization using RTK or WADGNSS localization while able to communicate with the necessary satellites and/or base stations, and may maintain accurate localization using IMU localization during brief periods in which the satellite communication is unavailable. In some embodiments, an AV does not require any GNSS-based communication and is able to effectively localize based upon environment detection, IMU data, and reference to a base map. In some embodiments, the IMU data is the primary input for determining localization, and environment detection is used to re-align the IMU to prevent drift. The aforementioned localization techniques are described by way of example and are not meant to limit the ways in which an AV may determine its location.

Base Map Generation

As discussed, base maps are an important component of AV operation, allowing an AV not only to transition seamlessly between absolute and relative localization, but also to reduce the processing power required for implementing SLAM techniques. In one embodiment, an AV that has been localized absolutely may reference a base map in order to determine its localization relative to nearby roadway features which are displayed in the base map. Specifically, a vehicle which has determined its absolute location, such as via a satellite connection or IMU data, may reference a base map to determine its position relative to roadway features such as lane markings, stop lights, fire hydrants, curbs, and buildings which are stored in the base map. In another embodiment, an AV which has been localized relative to roadway features in its driving environment, such as via LIDAR or image processing, may reference a base map in order to determine its absolute localization. Specifically, an AV collects environment detection data with onboard sensors, determines its position relative to certain roadway features, and determines its absolute location based upon the absolute locations of roadway features stored in the base map. In another embodiment, a base map is critical for effective operation of SLAM techniques. Specifically, an AV may collect a large amount of information regarding its driving environment and utilize a base map to filter out mapped objects, thus reducing the amount of processing power allocated to performing SLAM techniques on known elements of the environment.

In an exemplary embodiment, base map generation may be conducted using a feature mapping computing device ("FM computing device"). An unmanned aerial vehicle ("drone") may be used to collect high resolution photographs ("HD photos") of a driving environment that contains roadway features. Absolute localization of the drone during image capture enables the generation of localized HD images, which include both HD photos of the driving environment and location data associated with the HD photos. The FM computing device may process the localized HD images using photogrammetry to generate a highly detailed 3D point cloud ("HD point cloud") of the driving environment. The FM computing device may further process the HD point cloud and localized HD images using image recognition to both identify and classify roadway features depicted in the HD photos and HD point cloud. The FM computing device may then generate a base map from the classified roadway features and the HD point cloud and transfer the base map to an AV.

In the exemplary embodiment, a drone may be equipped with an image capturing device ("camera") capable of capturing high-resolution, HD photos of a driving environment. In one embodiment, the drone may traverse a predetermined flight path. In some embodiments, the drone may be manually operated. In still other embodiments, the drone may have autonomous capabilities and determines its own path. The drone is configured to fly at a height that is appropriate for the given environment. For example, in mapping a highway, the drone may be configured to fly at a height which is substantially above the height of the roadway, so as to maintain safety of the roadways. As another example, the drone may be configured to fly on the side of the road at a lower level to collect images from a different angle. In the exemplary embodiment, the drone is also equipped with a radio receiver for receiving GNSS transmissions. In some embodiments, the drone may be further equipped with a transceiver that enables RTK localization. In some embodiments, the drone may be equipped with wireless communication equipment such that it can communicate with a cellular network and/or a Wi-Fi internet connection. In the exemplary embodiment, the drone is also equipped with a processor which is in communication with a local storage device.

In the exemplary embodiment, the drone may be configured to determine the location at which each HD photo is captured (e.g., location data). Specifically, the drone may be localized using RTK, PPK, or some other localization technique, and the location of the drone may be used to determine the location at which each HD photo was captured. In one embodiment, the drone may utilize RTK localization. As the drone collects photographs of the environment, the location of the drone is known to a high accuracy, and a drone location at the time each HD photo was collected can be determined and associated with the respective HD photo. In another embodiment, the drone may utilize PPK localization. As the drone captures HD photos of the environment it determines its location (e.g., by using GNSS localization), and each HD photo and location determination is time-stamped. At the end of the trip, an error correction factor is applied to the stored drone locations, and the drone locations are associated with the HD photos based upon the time-stamps. In some embodiments, other localization techniques are used to determine a drone location and an associated HD photos location. The HD photos along with the location data are transferred by the drone as "localized HD images".

In the exemplary embodiment, the FM computing device may process the localized HD images using photogrammetry in order to generate an HD point cloud of the driving environment and determine relative positioning of the roadway features depicted in the localized HD images. Photogrammetry is a technique which allows the extraction of 3D spatial dimensions of an object or environment from two or more 2D images of the object or environment taken at different locations. A point cloud is a set of points in a 3D space which represent an object or environment in 3D. In the exemplary embodiment, localized HD images also include a camera angle associated with each HD photo, and a plurality of localized HD images is used to determine a 3D representation of a driving environment (e.g., a point cloud). In generating a 3D representation of the driving environment, the FM computing device necessarily determines the relative positions of all roadway features represented in the point cloud, and based upon the location data of the HD photos, absolutely localizes the HD point cloud. Specifically, the point cloud represents roadway features in a 3D space and can therefore be used to determine the positions of the roadway features relative to the drone. By combining the relative positions of the roadway features with the location data associated with each HD photo (e.g., the localization data from the drone), the roadway features are accurately localized. For example, a plurality of HD photos may depict a fire hydrant on the side of a road. Using photogrammetry to compare the plurality of photos, the FM computing device may generate an HD point cloud that accurately positions a 3D representation of the fire hydrant next to a 3D representation of the road. Further, the FM computing device may determine the locations of the 3D representations of the road and the fire hydrant relative to the drone, and may therefore be able to absolutely localize the road and the fire hydrant based upon the location of the drone. In the exemplary embodiment, the FM computing device may be configured to leverage particularly high-resolution HD photos in order to generate a detailed, HD point cloud. Further, the FM computing device is configured to generate an HD point cloud which contains color information, such that each data point in the point cloud includes data indicating both a point in 3D space and a color of the point. Such information may then be used for more effective AV operation. However, while the HD point cloud accurately represents the 3D environment and roadway features, it does not contain data specifically identifying and differentiating the represented roadway features.

In the exemplary embodiment, the FM computing device may further process the localized HD images and HD point cloud using image recognition ("IR") techniques. The FM computing device may employ IR techniques in order to identify and classify roadway features depicted in the localized HD images and/or HD point cloud. For example, the FM computing device may determine, using IR techniques, that a certain arrangement of colored pixels depicted in an HD photo or the HD point cloud indicates a tree. The FM computing device may further assign attributes to the tree, such as "tree", "natural landmark", and "immobile". In another example, a plurality of roadway features such as roads, trees, and fire hydrants are identified. As another example, the FM computing device uses IR techniques to identify transient roadway features such as bicycles, cars, or pedestrians. In the exemplary embodiment, the FM computing device may categorize and processes identified roadway features according to the particular feature. In one embodiment, the FM computing device assigns attributes to identified features, wherein the attributes include but are not limited to ID, type, priority, motion class, feature details, and location. For example, a stop sign may be identified and assigned the ID "stop sign", the type "road sign", the priority "high", motion class "immobile", feature details "red" and "reduce speed", and a location based upon location data associated with the HD photo.

In the exemplary embodiment, the FM computing device may apply image recognition to both the HD images and HD point cloud. In some embodiments, the FM computing device applies image recognition to the HD images and not the HD point cloud. In the exemplary embodiment, the FM computing device applies image recognition and photogrammetry techniques to localized HD images separately, but may apply the techniques simultaneously or in combination based upon a desired outcome. In other words, the FM computing is configured to utilize the outputs from image recognition processing as inputs for photogrammetry processing and/or is configured to utilize the outputs from photogrammetry processing as inputs for image recognition processing. For example, the FM computing device may initially apply object recognition techniques in order to identify and classify roadway features. The FM computing device may subsequently utilize the identified and classified roadway features as inputs for photogrammetry techniques, which may allow for the generation of a more detailed, accurately position HD point cloud. Similarly, the FM computing device may utilize the HD point cloud output from photogrammetry techniques as inputs in image recognition techniques, thereby improving the accuracy of image identification and classification and allowing for recognition of roadway features which are not clearly depicted in the HD images alone.

In the exemplary embodiment, the FM computing device may generate a base map based upon the classified features and HD point cloud. The FM computing device may be configured to overlay classified features onto the HD point cloud to generate a base map which contains a 3D representation of a driving environment, including labeled 3D representations of roadway features. In one embodiment, the FM computing device may be configured to embed feature details of classified features in the base map. For example, feature details for a stop sign indicating the color "red", the wording "STOP", and AV operating parameters "reduce speed to a stop" may be associated with the 3D representation of the roadway feature in the base map. In some embodiments, the embedded feature details assists in AV operation for an AV referencing the base map. In other words, an AV utilizing the base map for AV operation can use the embedded feature details to more accurately identify real-world roadway features that correspond to features included in the base map. For example, a stop sign feature in a base map may include information indicating the color red. An AV attempting to localize using object detection may detect an object with certain physical features, one of which indicates the object contains the color red. The indication of the color red may allow the AV to more quickly and accurately associate the stop sign in the base map with the detected object and thus, localize more quickly and accurately. As another example, a street sign feature in a base map may include information indicating that a feature contains the words "N Taylor St." An AV attempting to localize using object detection may detect the words "N Taylor St.", which may allow the AV to more quickly and accurately identify the street sign in the base map.

In the exemplary embodiment, the FM computing device may convert an HD point cloud into a base map. In another embodiment, the FM computing devices may use data extracted from a point cloud to update an already existing base map. In some embodiments, the FM computing device may generate a base map which is extremely detailed. For example, a traditional base map, which may have been generated based upon LIDAR inputs, may not include any information which LIDAR sensors are not equipped to detect, such as wording on signs, lane markings, or colors. Further, a traditional base map may be limited by the fact that the image data was collected by a ground-based vehicle. In the exemplary embodiment, the FM computing device generates a base map based upon an HD point cloud with includes high-resolution data points and color. Further, the FM computing device overlays classified features onto the HD point cloud, providing even more detailed information. In one example usage, these detailed base maps may allow for more efficient and accurate AV operation.

In some embodiments, the FM computing device may leverage the HD point cloud and classified images to generate a data-efficient base map. In the exemplary embodiment, the FM computing device may remove insignificant features and data points from the point cloud in order to reduce the size of the point cloud. For example, the FM computing device may remove feature and/or data points which are related to roadway features located a certain distance from the roadway. In another example, embedded feature details may be used as an additional source of information for identifying a feature in the base map, such that certain data points or feature attributes can be removed. For example, it may be more data-efficient to represent a stop sign using critical edge points to represent the object along with data-input regarding the feature color, as compared to representing the stop sign with numerous points representing the entire shape of the stop sign and no color information.

Exemplary Mapping System

FIG. 1 depicts an exemplary mapping system 100 in accordance with an exemplary embodiment of the present disclosure. In the exemplary embodiment, mapping system 100 may include unmanned aerial vehicle ("drone") 102, feature mapping computing device ("FM computing device") 104, and autonomous vehicle ("AV") 106. FM computing device 104 is capable of generating highly-detailed base maps (3D) based upon localized HD images (2D) received from drone 102.

Drone 102 may include a high resolution camera and may be configured to collect HD photos 108 of a driving environment 110, wherein the driving environment 110 contains roadway features 112 (e.g., pedestrians, cars, bikes, trees, lane markings, buildings, curbs, street signs, stoplights, and intersections). FM computing device 104 may be configured to receive a plurality of HD photos 108 from drone 102 and process the images using image recognition and photogrammetry. Using image recognition techniques, FM computing device 104 may be configured to identify and classify roadway features 112. Using photogrammetry techniques, FM computing device 104 may be configured to generate HD point cloud 114. FM computing device 104 may be further configured to generate a base map 116, wherein base map 116 comprises point cloud 114 and mapped roadway features 118. Specifically, base map 116 may include data from HD point cloud 114 embedded with data from classified features 404. FM computing device 104 may be configured to transfer base map 116 to AV 106.

Exemplary System for Capturing Aerial Images

Figure 2:
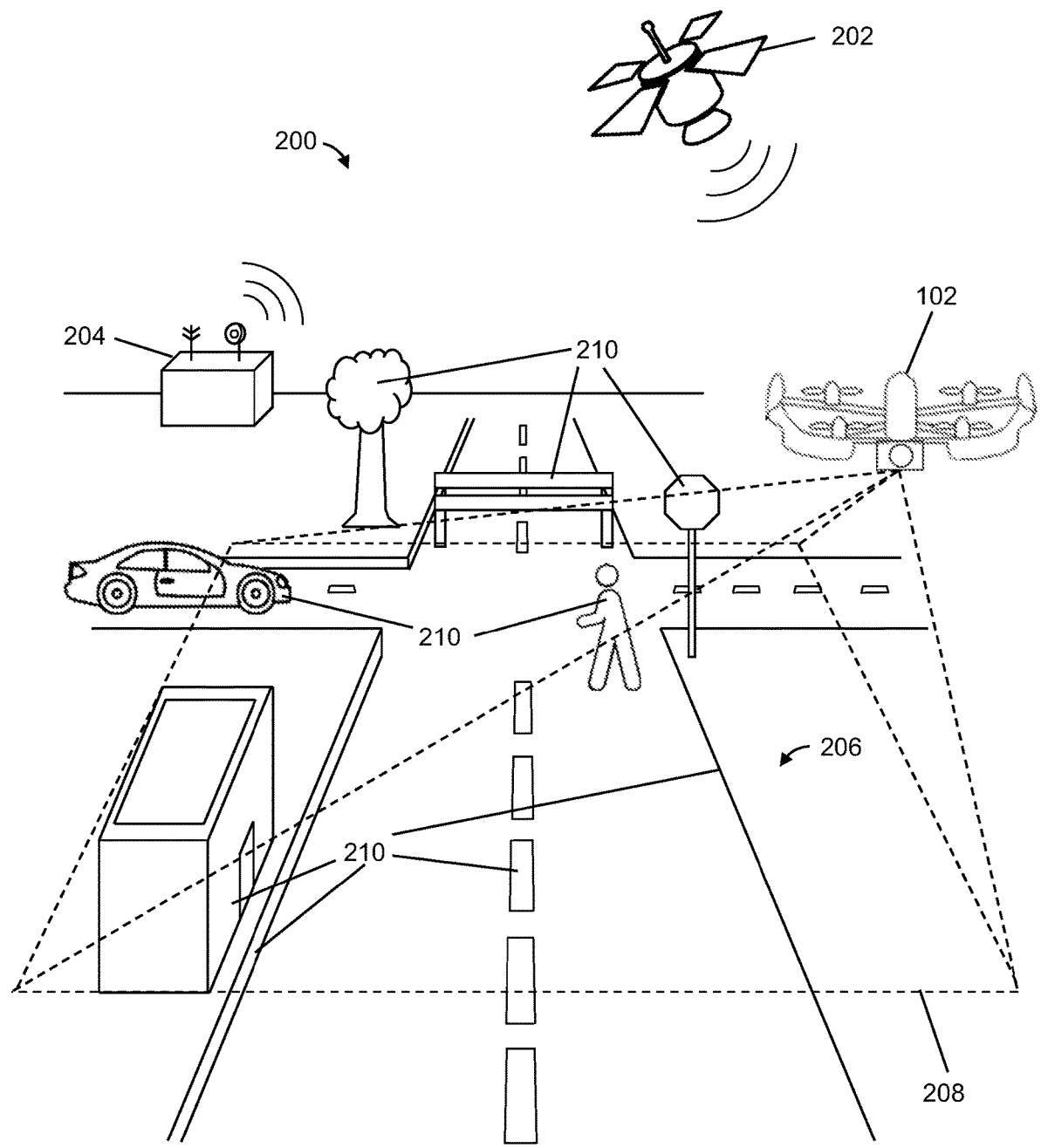
FIG. 2 illustrates an exemplary system for capturing aerial images using a drone in accordance with the mapping system illustrated in FIG. 1.

FIG. 2 depicts an exemplary system 200 for capturing aerial images using drone 102. Drone 102 may include a high-resolution image capturing device and may be configured to collect aerial images of driving environment 206, wherein a captured aerial image of driving environment 206 constitutes an HD photo 208. Driving environment 206 includes roadway features 210, which include but are not limited to lane markings, buildings, curbs, road transitions, road signs, construction barriers, natural landmarks, vehicles, pedestrians, bikers, horse-and-buggies, and railroad crossing barriers. Drone 102 may be configured to communicate with satellite navigation system 202 and base station 204 such that drone 102 can be accurately localized. Drone 102 may be further configured to associate captured HD photos 208 with the location of drone 102 at the time the HD photo 208 is captured.

Drone 102 may include a high-resolution image capturing device ("high-res camera") (e.g., an electro-optical payload), such as RGB, multispectral, red-edge infrared sensors, which is used to collect HD photos 208 of driving environment 206. In one embodiment, the high-res camera is configured to capture images at a set angular diameter, directed at a set angle from the body of drone 102. In another embodiment, drone 102 is configured to adjust the angular diameter and/or direction and/or focus of the high-res camera. For example, drone 102 may focus the high-res camera on a particularly complex building or ambiguous construction markings such that a higher number of images or higher quality images of the feature of interest are captured. In another embodiment, the high-res camera collects images in a 360° diameter around drone 102.

In the exemplary embodiment, drone 102 may be controlled through a Ground Control System (GCS), which uses a flight program to plan flights over driving environments. In one embodiment, flights are planned manually, while in another embodiment, flights are automatically planned by a flight plan processing unit based upon certain criteria. For example, data for mapped and unmapped territory may be provided to the flight plan processing unit and a flight plan may be determined based upon the mapped versus unmapped territory. In one embodiment, drone 102 is manually controlled. For example, an error in a flight plan or drone navigation systems may require a manual override for a period of time. In the exemplary embodiment, flight paths are planned such that drone 102 flies within a specific height range such that an appropriate level of ground sampling distance (GSD) image resolution is acquired. In a preferred embodiment, flights occur between 100 and 400 feet above the driving environment. In one embodiment, an air corridor flight path may be defined by the flight plan processing unit, and multiple passes are conducted to obtain a desired level of image overlap. In some embodiments, image overlap is necessary in order to enable the development of a point cloud through photogrammetry. In one embodiment, two passes through the flight path are required for a two lane roadway, and an additional pass is required for each additional lane. Flights conducted with drone 102 further include safety operations necessary to meet Federal Aviation Administration (FAA) requirements.

In the exemplary embodiment, drone 102 may be in communication with satellite navigation system ("satellite") 202 and base station 204. Drone 102 may include a receiver for communicating with satellite 202 and a transceiver for communicating with base station 204. For example, drone 102 may include both a receiver for receiving a GPS navigation signal from satellite 202 and a separate transceiver for communicating with base station 204. In an exemplary embodiment, satellite 202 is a global navigation satellite system (GNSS). In an exemplary embodiment, base station 204 is a real-time kinematic (RTK) base station, and drone 102 localizes absolutely in real time through communication with satellite 202 and base station 204. Drone 102 records its satellite-location at a given point in time based upon communication with satellite 202. Base station 204, which has a known ground-truth location, communicates with satellite 202 and determines an error correction factor for satellite-locations determined using satellite 202. In some embodiments, error correction factors may be stored in a database associated with base station 204, and the database may be accessible via a remote server. Drone 102 communicates with base station 204, receives the error correction factor from base station 204, and applies the error correction factor to drone 102's satellite-location, thus determining absolute location. In one embodiment, drone 102 is localized to an accuracy of 10 cm or less.

In an alternative embodiment, drone 102 may localize using post-processing kinematics (PPK). Drone 102 may record its satellite-locations determined at given points in time during a flight. After the conclusion of the flight, drone 102 receives time-stamped error correction factors from base station 204 and applies the error-correction factors to the recorded satellite-locations of drone 102 based upon the time-stamps. In another embodiment, drone 102 localizes in real time using wide-area differential GNSS (WADGNSS)-based localization. In one embodiment, drone 102 includes a processor which applies an error correction factor to satellite-locations recorded at drone 102. In another embodiment drone 102 transfers its satellite-locations to a remote processor which applies the error correction factors.

As drone 102 traverses a flight path over driving environment 206, a high-res camera may capture HD photos 208 of driving environment 206, and each HD photo 208 may be given a time-stamp. Simultaneous to capturing HD photos 208, drone 102 may receive and record satellite-locations from satellite 202, and the satellite-locations may also be given a time-stamp. Error correction factors received from base station 204 are applied to the satellite-locations, either locally at drone 102 or remotely, and the corrected locations are associated with each HD photo 208 by matching the time-stamps of the HD photos 208 and the corrected locations. In an alternate embodiment, HD photos 208 are associated with the satellite-locations based upon the time-stamp prior to applying the error correction factors to the satellite-locations. From the inputs of captured HD photos 208, satellite-locations associated with drone 102 received from satellite 202, and error-correction factors received from base station 204, system 200 outputs accurately localized HD images 208 of a driving environment 206.

In the exemplary embodiment, drone 102 may also be equipped with a processor in communication with a local storage device. In some embodiments, drone 102 is equipped with wireless communication equipment such that it can communicate with a cellular network and/or a Wi-Fi internet connection.

Exemplary Data Flow for Generating a Base Map

Figure 3:
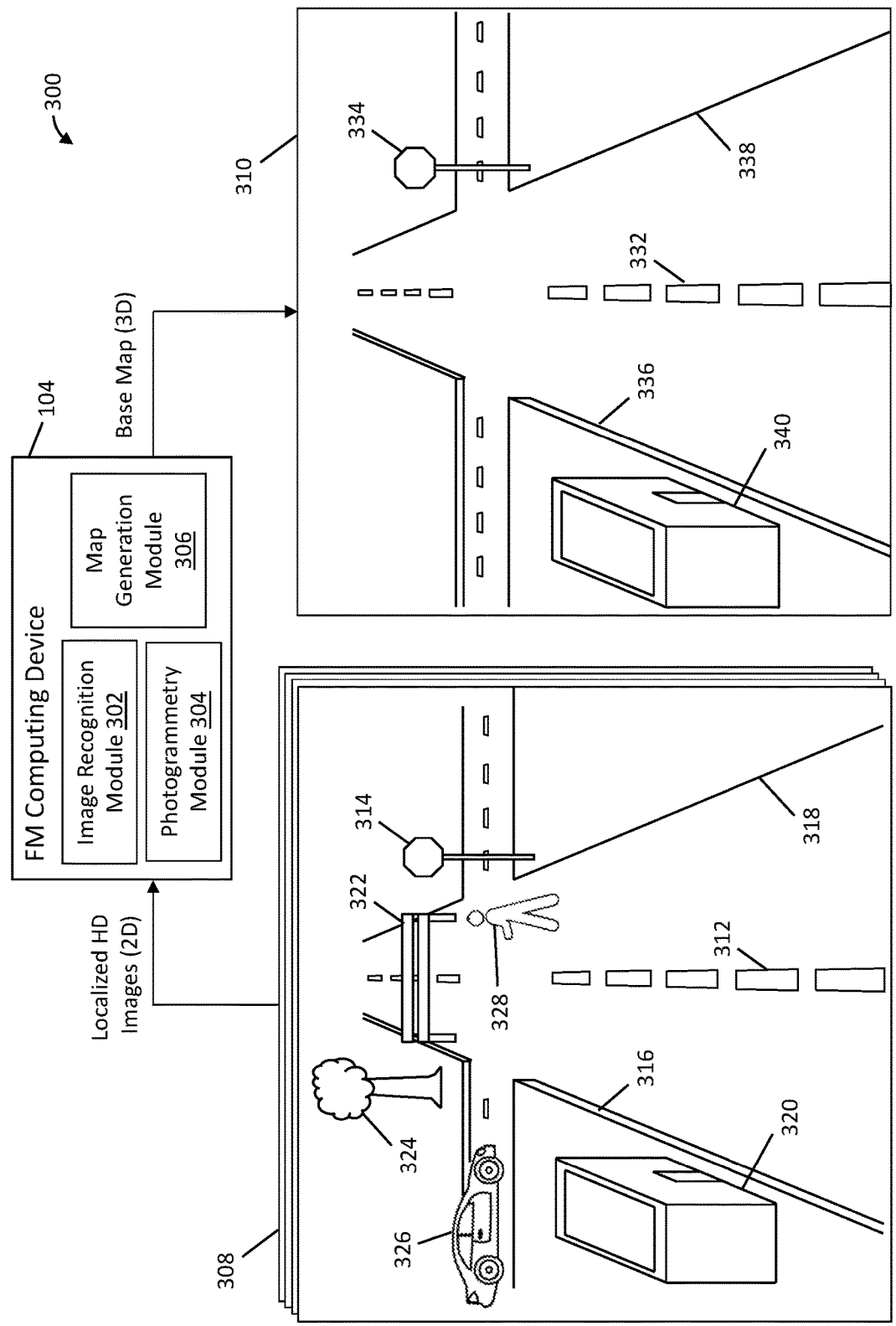
FIG. 3 illustrates an exemplary data flow through a computing device component included in the mapping system illustrated in FIG. 1, wherein the data flow depicts the mapping of roadway features and generation of a base map.

FIG. 3 depicts an exemplary data flow 300 though a mapping system (e.g., mapping system 100, shown in FIG. 1) for mapping features and generating a base map (e.g., base map 116 shown in FIG. 1). FM computing device 104 may be configured to receive a plurality of localized HD images 308, process the localized HD images 308 using image recognition ("IR") module 302, photogrammetry module 304, and base map generation module 306, and generate a base map 310. Localized HD images 308 comprise both HD photos of a driving environment in 2D and location data associated with the HD photos. Base map 310 depicts the driving environment in a 3D model. In the exemplary embodiment, localized HD images 308 depict a plurality of roadway features, and base map 310 depicts at least one mapped feature corresponding to the roadway features in HD photos 308. Photogrammetry module 304 may process a plurality of consecutive HD photos 308 and generates an HD point cloud of the driving environment based upon angular differences between roadway features depicted in HD photos 308. Image recognition module 302 may employ image recognition techniques to identify individual roadway features depicted in localized HD images 308 and/or the HD point cloud. Image recognition module 302 may further classify the roadway features based upon the type, priority, or feature details of the roadway feature, as described further below. Base map generation module 306 combines the classified features, HD point cloud, and location data associated with the HD photos to generate a localized, 3D base map ("base map"). The base map contains not only an absolutely localized 3D representation of specific roadway features, but also contains information regarding details of the mapped features.

In the exemplary embodiment, localized HD images 308 depict a plurality of roadway features, such as lane markings 312, road signs 314, curb 316, road transition 318, building 320, road closure 322, natural landmark 324, vehicle 326, and pedestrian 328. Lane markings 312 include, but are not limited to, to any markings painted or depicted on the road, such as lane lines, double-yellow lines, cautionary markings, turn lane markings, railroad crossing markings, speed bumps, and/or intersection/stop sign indicators. Road signs 314 include, but are not limited to, any physical signage structure such as a stop sign, a stop light, a yield sign, a street sign, a merge sign, a highway exit sign, and a merge sign. Curb 316 includes, but is not limited to, a physically elevated curb. Road transition 318 includes, but is not limited to, any non-curb transition from a road to a non-driving surface, such as a road-dirt transition, a road-gravel transition, road-grass transition, road-tree transition, road-water transition, road-ditch transition, or road-cliff transition. Building 320 includes, but is not limited to, any man-made building or structure, such as a house, a skyscraper, a barn, a mall, an office, a store, a tent, and a kiosk. Road closure 322 includes, but is not limited to, any intentional obstruction to the road, such as traffic cones, a construction barrier, a railroad crossing barrier, an event-based road closure, and a police blockade. Natural landmark 324 includes, but is not limited to, natural landscape features such as trees, cliffs, rocks, bushes, ditches, and animals. Vehicle 326 includes, but is not limited to, man-made vehicles such as cars, trucks, airplanes, buses, trains, motorcycles, bicycles, horse-and-buggies, and Segways. Pedestrian 328 includes, but is not limited to, any person not using a vehicle for transportation, people with or without vehicles using a sidewalk, and pets.

In the exemplary embodiment, base map 310 contains a plurality of mapped features, such as lane markings 332, road sign 334, curb 336, road transition 338, and building 340. The mapped features correspond with the roadway features identified in HD photos 308, and FM computing device 104 may determine which roadway features are included as mapped features in base map 310. In the example embodiment, road closure 322, natural landmark 324, vehicle 326, and pedestrian 328 are not included as mapped features in base map 310.

FM computing device 104 may determine which roadway features are included as mapped features based upon feature attributes determined by IR module 302. IR module 302, in addition to identifying roadway features, may determine attributes associated with each roadway feature. IR module 302 may output classified features, wherein classified features comprise identified roadway features and associated feature attributes. In one embodiment, IR module 302 determines feature attributes such as ID, type, priority, motion class, and feature details. The ID attribute refers to an identification tag for a roadway feature. For example, building 320 may be assigned an ID attribute "house", indicating the building is a house. The type attribute refers to a broad category the roadway feature falls under. For example, building 320 may be assigned a type attribute "building". The priority attribute refers to how important the roadway feature is with regard to effective AV operation in the vicinity of the roadway feature. For example, building 320 may be assigned a priority attribute of "medium-high", indicating that building 320 is a roadway feature of note, but may not have significant implications in AV operation. The motion class attribute refers to whether the roadway feature is static or dynamic. For example, building 320 may be assigned a priority attribute of "static", indicating that building 320 does not move. The feature details attribute refers to additional details about the roadway feature which may be relevant in the generation of a base map, such as color, wording, and AV operation parameters. For example, building 320 may be assigned the feature details "brown" and "no additional operation parameters", indicating the building is brown and there are no additional AV operation parameters associated with the building (e.g., an AV does not have to do anything other than avoid the building).

As an additional example, IR module 302 may determine attributes associated with road sign 314. IR module 302 may assign an ID attribute "stop sign", indicating the feature is a stop sign; a type attribute "road sign", indicating the feature falls under the category of road sign; a priority attribute "high", indicating the feature is important for AV operation; a motion class attribute "static", indicating the feature does not move; and feature details "red", "STOP", and "decelerate to a stop", indicating road sign 314 is red, contains the word "STOP", and indicates that an AV should decelerate to a stop.

Based upon the classified features determined by IR module 302, MG module 306 may determine which roadway features are included as mapped features in base map 310. In general, roadway features which are included as mapped features are features which are relatively permanent and/or are important for AV operation. In the exemplary embodiment, vehicle 326 and pedestrian 328 are relatively transient (e.g., unlikely to be in the exact same spot for very long). Therefore, including them in base map 310 is not beneficial, as neither vehicle 326 nor pedestrian 328 are likely to be in the spot that would be indicated in base map 310. MG module 306, then, excludes vehicle 326 and pedestrian 328 from base map 310. In the exemplary embodiment, natural landmark 324 represents a tree which is not included in the base map. In some embodiments, it may be beneficial to exclude certain natural landmarks from base map 310. For example, trees change shape and color with the seasons and might not be as permanent as man-made structures such as street signs and buildings. In some embodiments, natural landmarks are included in base map 310. For example, a tree may meet the criteria for permanence necessary to be included as a mapped feature in a base map. In another example, a tree may in a location which significantly impacts AV operation and thus may be included in a base map. Similarly, in some embodiments, road closures 322 are included as mapped features in base map 310. For example, a frequently updated base map for a well-traveled area may be updated to include temporary road closures such as construction barriers. In another example, a daily road closure for an event may not be included in the base map.

In the exemplary embodiment, the mapped features included in base map 310 are also absolutely localized based upon the HD point cloud and the location data associated with the localized HD images 308. Further, base map 310 may include additional information associated with the mapped features, information which may assist AV operation for AV's using base map 310. After generating base map 310, FM computing device 104 transfers base map 310 to an autonomous vehicle for use in AV operation.

Exemplary Data Flow for Generating a Base Map

Figure 4:
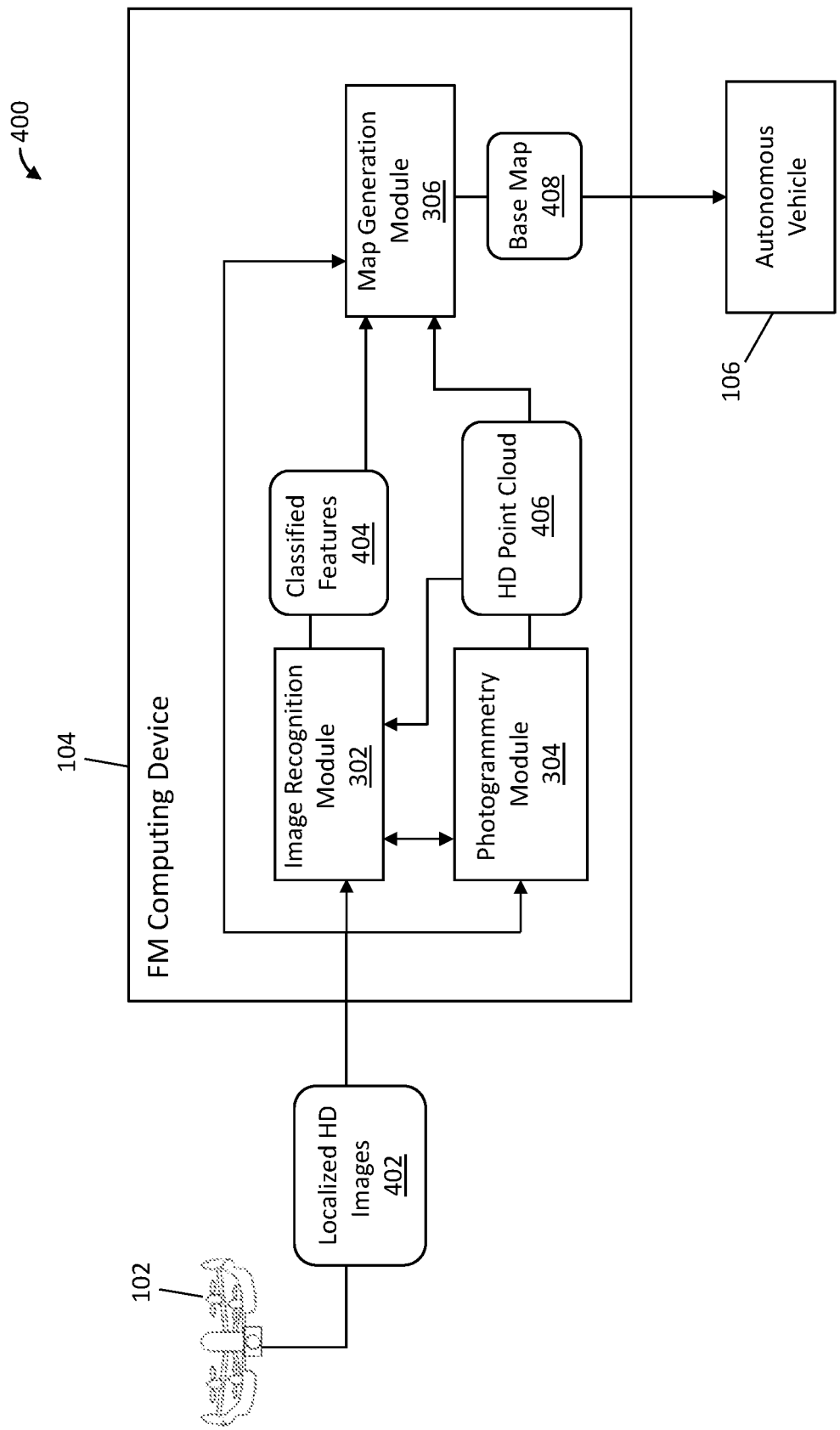
FIG. 4 illustrates an exemplary data flow through the mapping system illustrated in FIG. 1, wherein the data flow depicts the generation of the base map shown in FIG. 3.

FIG. 4 illustrates an exemplary data flow 400 through a mapping system (e.g., mapping system 100, shown in FIG. 1) during the generation of a base map (e.g., base map 116 shown in FIG. 1). FM computing device 104 may receive localized HD images 401 from drone 102, wherein localized HD images 402 include HD photos of a driving environment, location data associated with each HD photo, and camera orientation data associated with each HD photo. FM computing device 104 may process localized HD images 402, generates base map 408, and transfers base map 408 to autonomous vehicle ("AV") 106. FM computing device 104 includes image recognition module ("IR module") 302, photogrammetry module 304, and map generation module ("MG module") 306, all of which play a specific role in generating the base map from the localized HD images. Photogrammetry module 304 applies photogrammetry techniques to localized HD images 402 and generates a HD point cloud 406. IR module 302 identifies and classifies roadway features depicted in localized HD images 402 and HD point cloud 406 and outputs classified features 404. Map generation module ("MG module") 306 combines localized HD images 402, classified features 404, and HD point cloud 406 and generates base map 408.

In the exemplary embodiment, FM computing device 104 may receive localized HD images 402 from drone 102, wherein localized HD images 402 include HD photos, location data, and camera orientation data. HD photos may be captured by drone 102 via an image capture device ("camera"), location data indicating the location at which the HD photo was captured may be recorded, and camera orientation data indicating the angle of the camera at the time of image capture may be recorded. In an alternate embodiment, FM computing device 104 receives localized HD images from an HD photo database. In the exemplary embodiment, the location data included in the localized HD images 402 has been corrected with a location correction factor. For example, drone 102 may employ RTK localization techniques and apply a location correction factor to the location data in real time. As another example, PPK localization techniques may be employed and a location correction factor may be applied to the location data after the completion of drone 102's trip. In another embodiment, FM computing device 104 receives un-corrected location data and applies an error correction factor. In such an embodiment, FM computing device 104 receives HD photos, un-corrected location data, camera orientation data, and location correction data. FM computing device 104 applies the location correction data to the un-corrected location data to generate location data which may then be associated with the HD photos. In the exemplary embodiment, localized HD images 402 depict a driving environment, wherein the driving environment includes roadway features. FM computing device 104 receives localized HD images 402 and utilizes various modules for processing localized HD images 402.

In the exemplary embodiment, photogrammetry module 304 may receive localized HD images 402, which are 2D images of a driving environment, and may utilize photogrammetry techniques to generate HD point cloud 406, which is a 3D representation of the driving environment. In other words, photogrammetry module 304 may utilize localized HD images 406 (e.g., HD photos, location data, and camera orientation data) as inputs, and may generate HD point cloud 406 as an output. The photogrammetry techniques employed by photogrammetry module 304 require a plurality of HD photos, location data associated with the images, and a camera orientation associated with the images in order to generate an HD point cloud from the 2D images. Specifically, photogrammetry module 304 analyzes a first HD photo depicting a driving environment, and based upon the location data (e.g., the camera when the HD photo was captured, including the height of the camera above the ground) and the camera orientation data (e.g., the orientation of the camera when the HD photo was captured) associated with the first HD photo, photogrammetry module 304 calculates a first plurality of vectors from the camera to each image point of the first HD photo, wherein the image point refers to a specific point in the driving environment. Photogrammetry module 304 subsequently analyzes a second HD photo, wherein the second HD photo depicts the same driving environment and was captured along the same flight-path as the first HD photo, and based upon the location data and the camera orientation data associated with the second HD photo, photogrammetry module 304 calculates a second plurality of vectors from the camera to each image point of the second HD photo. By comparing the intersections of first vectors and second vectors pointing to the same image point, photogrammetry module 304 calculates the 3D spatial positioning of the image point. By repeating this process for a plurality of image points in each HD photo, photogrammetry module 304 generates an HD point cloud that represents the driving environment.

Photogrammetry module 304 may identify image points in the HD photos, such that each image point refers to the same specific point in the driving environment across the HD photos. Thus, as the HD photos are collected, a given image point will change coordinates within the HD photos. For example, in a first HD photo an image point representing the top of a tree may be at coordinate (0,0), wherein the coordinates refer to the pixels of the HD photo. In a second HD photo, the same image point representing the top of the tree may be at coordinate (0, −10). When comparing first and second vectors drawn to a particular image point, photogrammetry module 304 determines the 3D position of the image point based upon the point of intersection of the vectors, and/or the change in the angle of the vector relative to the camera.

Photogrammetry module 304 may require a certain number of identifiable image points in order to create an accurate 3D representation of the driving environment. In one embodiment, a higher number of HD photos allows for more iterations of the vector comparison process, and thus, a more accurate HD point cloud 406. In one embodiment, drone 102 makes multiple passes through its flight path in order to collect additional HD photos. In some embodiments, drone 102 makes multiple passes over a driving environment through different flight paths in order to collect HD photos at different angles and locations. In alternative embodiments, the camera used by drone 102 to capture HD photos captures images at varying speeds. In one embodiment, the camera captures images very quickly, thus increasing the number of images available for processing by photogrammetry module 304.

In addition to the number of HD photos available to photogrammetry module 304, the resolution of the HD photos affects the definition of the point cloud generated by photogrammetry module 304. In the exemplary embodiment, photogrammetry module 304 may leverage the data-density of high-definition images (HD photos) in order to identify a higher number of image points with greater accuracy. With a higher number of identifiable image points, photogrammetry module 304 is able to generate a point cloud with high granularity and data density. In other words, photogrammetry module 304 leverages HD photos to create highly detailed and accurately positioned 3D representation of roadway features in the driving environment. For example, a pine tree may be depicted in an HD photo, and photogrammetry module 304 may leverage the details in the HD photo to identify and track image points which correspond to individual branches on the pine tree. Photogrammetry module 304 may then generate a 3D representation of the pine tree which includes individual branches. Additionally, photogrammetry module 304 leverages HD photos for reducing errors in generating an HD point cloud. Specifically, photogrammetry module 304 more accurately identifies and tracks image points between HD photos, thus reducing errors related to invalid identification and/or tracking of image points. In other words, photogrammetry module 304 identifies the same image point among HD photos more accurately, thus reducing errors in point cloud generation. In the exemplary embodiment, photogrammetry module 304 is configured to utilize the HD photos collected by drone 102 to generate HD point clouds with high granularity and a low instance of errors.

In one embodiment, photogrammetry module 304 may aggregate multiple types of data within HD point cloud 406. In other words, each point in HD point cloud 406 may be associated with multiple types of data. Photogrammetry module 304 may utilize the location data from localized HD images 402 in order to absolutely localize HD point cloud 406, such that each point in HD point cloud 406 is absolutely localized. In general, the relative localization between each point in HD point cloud 406 is inherent. In some embodiments, photogrammetry module 304 includes specific relative localization values for each point oriented in HD point cloud 406. In some embodiments, photogrammetry module 304 may include localized HD images 402 associated with certain areas of HD point cloud 406. For example, if a group of localized HD images 402 was used to generate the 3D representation of an area of a driving environment, photogrammetry module 304 may associate those localized HD images with certain points in HD point cloud 406.

In the exemplary embodiment, IR module 302 may receive localized HD images 402 and HD point cloud 406 and may utilize image recognition techniques to identify and classify roadway features depicted in localized HD images 402 and HD point cloud 406 and generate classified features 404. Using localized HD images 402 and HD point cloud 406 as inputs, IR module 302 may output classified features 404, wherein classified features 404 comprise identified features (e.g., roadway features which were identified in the HD photos) and feature attributes associated with the identified features.

In the exemplary embodiment, IR module 302 analyzes the HD photos contained in localized HD images 402 and identifies roadway features depicted in the HD photos. As discussed above and described in more detail below, IR module 302 further determines feature attributes and assigns the feature attributes to each identified feature. For example, IR module 302 may determine feature attributes such as an ID, type, priority, motion class, and additional details for an identified feature. In some embodiments, IR module 302 absolutely localizes the identified features based upon location data associated with the HD photos, and feature location is included as a feature attribute.

In the exemplary embodiment, IR module 302 may also utilize HD point cloud 406 to improve the identification and classification of roadway features. In addition to analyzing the HD photos, IR module 302 analyzes HD point cloud 406 and identifies roadway features represented in HD point cloud 406. In some embodiments, the 3D representation of the driving environment contained in HD point cloud 406 provides additional information which is utilized by IR module 302 for identifying images. For example, HD point cloud 406 may include a 3D representation of a tree which has contours and/or colors which blend into the surrounding environment when viewed in the 2D HD photos, thus making it difficult to identify the tree as a roadway feature using image recognition techniques. However, the 3D representation of the tree may be used as additional information to allow IR module 302 to identify the tree as a roadway feature, and subsequently determine feature attributes for the identified feature. As another example, an object which may be difficult to identify in a single 2D image, such as a stop sign viewed from above, may be more easily identified and classified using the 3D representation contained in HD point cloud 406. In some embodiments, IR module 302 identifies and classifies features depicted in localized HD images 402, and does not utilize data from HD point cloud 406.

In some embodiments, photogrammetry module 304 may receive classified features 404 from IR module 302 and may use classified features 404 to generate a higher-resolution HD point cloud 406. Classified features 404, which include both identified features and feature attributes associated with the identified features, provide additional information for photogrammetry module 304 to use in the generation of HD point cloud 406. Specifically, photogrammetry module 304 may use information extracted from classified features 404 to more accurately identify and track image points among HD photos. In one embodiment, photogrammetry module 304 utilizes identified features to more accurately determine the contours of roadway features depicted in the HD photos, thereby allowing for more accurate identification of image points between HD photos. For example, it may be easier for photogrammetry module 304 to track the image points corresponding to the roof of a building when the building has already been identified by IR module 302. In another embodiment, photogrammetry module 304 utilizes feature attributes, such as feature color, to more accurately identify and track image points associated with a particular roadway feature. For example, it may be easier for photogrammetry module 304 to track the image points corresponding to a stop sign when the stop sign has been assigned the feature attribute "red" (e.g., photogrammetry module 304 identifies red points as corresponding to the stop sign).

Photogrammetry module 304 may also absolutely localize HD point cloud 406, and thus the features represented in the point cloud, using location data associated with the HD photos. HD point cloud 406 represents roadway features in a 3D space (e.g., in x, y, z coordinates), so features represented in HD point cloud 406 are necessarily localized relative to each other and localized relative to the point cloud as a whole. Photogrammetry module 304 utilizes location data associated with the HD photos to absolutely localize HD point cloud 406 (e.g., localize the point cloud relative to the Earth), thereby absolutely localizing all features represented in the point cloud. In one embodiment, photogrammetry module 304 localizes HD point cloud 406 while simultaneously generating HD point cloud 406. Specifically, while photogrammetry module 304 analyzes the vectors associated with image points in HD photos, it also localizes the image points, and therefore the point cloud, based upon the location data.

In the exemplary embodiment, map generation module ("MG module") 306 may receive localized HD images 402, classified features 404, and HD point cloud 406 and may generate base map 408. Specifically, MG module 306 may utilize location data associated with HD photos, identified features, feature attributes, and HD point cloud 406 as inputs to generate base map 408 as an output. MG module 306 generates a base map (e.g., base map 408) that is absolutely localized, overlaid with classified features, and data efficient.

In the exemplary embodiment, MG module 306 may receive HD point cloud 406, wherein HD point cloud 406 is absolutely localized. In some embodiments, HD point cloud 406 is not absolutely localized, and MG module 306 utilizes location data to absolutely localized HD point cloud 406 in a process similar to that described above. In some embodiments, MG module 306 combines HD point cloud 406 and classified features 404 and utilizes the feature location attribute of classified features 404 to absolutely localize HD point cloud 406.

In the exemplary embodiment, MG module 306 may combine classified features 404 and HD point cloud 406 such that classified features 404 are overlaid onto HD point cloud 406. In other words, the features identified by IR module 302 are associated with their 3D representations generated by photogrammetry module 304. In one embodiment, MG module 306 associates classified features 404 with their 3D representations in HD point cloud 406 by comparing the absolute locations of classified features 404 and HD point cloud 406. Specifically, IR module 302 and photogrammetry module 304 are configured to localize the classified features 404 and HD point cloud 406 respectively, and by referencing the locations of both classified features 404 and HD point cloud 406, MG module 306 is able to overlay classified features 404 onto HD point cloud 406. In another embodiment, MG module 306 associates classified features 404 with HD point cloud 406 based upon image points determined by photogrammetry module 304. Specifically, photogrammetry module 304 utilizes classified features 404 as input for determining image points, and MG module 306 leverages the relationship between the image points and classified features 404 in order to overlay classified features 404 onto HD point cloud 406. In another embodiment, photogrammetry module 304 associates classified features 404 with HD point cloud 406 based upon the image-points-method described above.

MG module 306 may further embed classified features 404 within base map 408 such that feature attributes associated with mapped features represent accessible data points. In other words, MG module 306 embeds feature attributes along with identified features such that additional information (e.g., the feature attributes) is available within base map 408. In one embodiment, feature attributes such as feature color, feature wording, and AV operation parameters are particularly of note. For example, MG module 306 may embed an identified building with a feature color of "red". An AV utilizing base map 408 as a reference, then, may have additional information to use in identifying the building. As another example, MG module 306 may embed a road sign with the feature wording "N Taylor St". An AV utilizing base map 408 as a reference, then, may be able to identify the upcoming road sign as the street sign for N Taylor St, information which may be applicable to AV navigation systems. As yet another example, MG module 306 may embed a stop sign with an AV operation parameter indicating that vehicles should slow down to a stop at a given distance from the stop sign. As a final example, MG module 306 may embed a stop light with the feature colors red, yellow, and green and an AV operation parameter indicating a vehicle should take certain actions based upon the color displayed at the stop light.

In the exemplary embodiment, MG module 306 may minimize the amount of data required to store base map 408 by optimizing the data points which are used to represent base map 408. Specifically, MG module 306 removes unnecessary data points from HD point cloud 406, eliminates unnecessary features and/or feature attributes from classified features 404, determines critical points and critical attributes which can be used to more efficiently represent mapped features in base map 408, and vectorizes certain mapped features represented in base map 408.

MG module 306 may analyze HD point cloud 406, determine unnecessary data points, and eliminate those data points. In one embodiment, MG module 306 determines points that have no bearing on the potential operation of AVs and eliminates those points. For example, MG module 306 may identify data points in HD point cloud 406 which represent areas of the driving environment which are irrelevant to AV operation (e.g., greater than a certain distance from the road, above the road, the tops of buildings, etc.) and eliminate those data points. As another example, MG module 306 may identify data points which represent impermanent roadway features such as vehicles or pedestrians which were represented in HD point cloud 406.

MG module 306 may also analyze classified features 404 and may determine features and/or feature attributes which are unnecessary and/or undesired for representation in base map 408. In other words, based upon identified features and feature attributes, MG module 306 determines the identified features and feature attributes which will be excluded from base map 408. In one example, impermanent features like vehicles and pedestrians are removed from base map 408. In another example, identified features with a low priority attribute are removed. In yet another example, undefined or uninformative feature attributes are removed from classified features 404.

MG module 306 also may determine critical points and critical attributes which may be more used to more efficiently represent mapped features and the driving environment in base map 408. Critical points refer to a set of data points in HD point cloud 406 which provide all the relevant information about a roadway feature or parts of the driving environment. For example, for a flat building like a skyscraper, critical points may refer to points which map only the outer edges of the building up to a certain height. In other words, points which map the front and side faces of the building may be irrelevant insofar as mapping the edges provides an outer boundary for the building. Critical attributes refer to feature attributes which are particularly relevant for an identified feature and which allow for a reduction in the inclusion of other data points. For example, for a stop sign, a critical attribute might refer to the color red, which can be used to identify the road sign as a stop sign without requiring the identification of the words "STOP". As another example, a critical attribute for a stop sign may be a feature detail indicating an approaching AV should slow down to a stop, wherein the inclusion of such an attribute may obviate the need to include attributes indicating the words "STOP" or the color red. MG module 306 determines critical points and critical attributes in HD point cloud 406 and classified features 404, thereby reducing the amount of data required to represent base map 408.

MG module 306 may also vectorize data points which represent features and aspects of the driving environment represented in HD point cloud 406. Similar to the determination of critical points, MG module 306 determines a group of data points which represents a single feature or aspect, and vectorize the points such that a vector represents the feature or aspect rather than numerous individual data points. For example, MG module 306 may determine that a group of yellow data points represents double yellow lines running down the middle of the road, and MG module 306 may represent the data points with a single vector rather than a plurality of individual data points.

Exemplary Data Flow for Generating Classified Features

Figure 5:
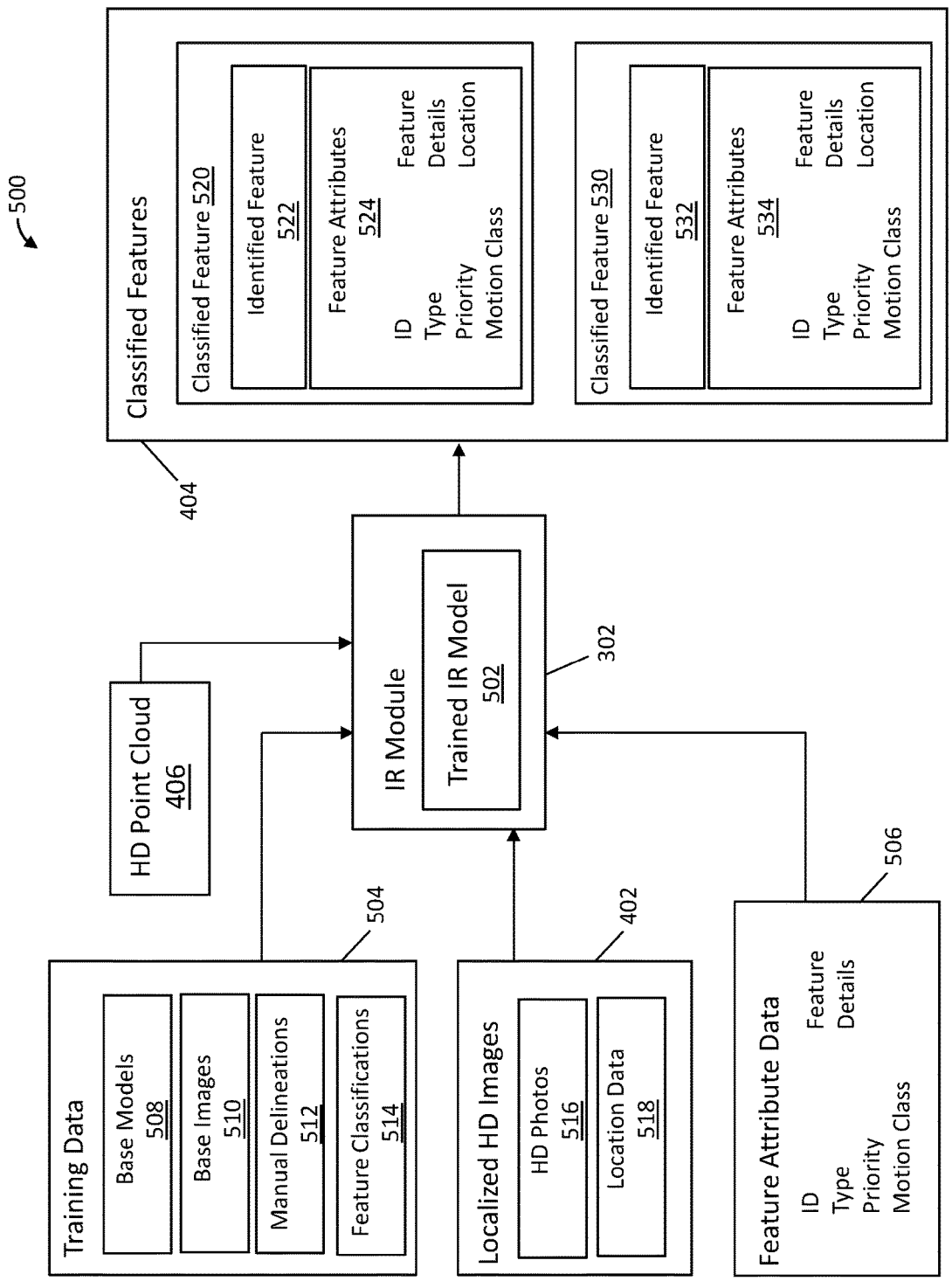
FIG. 5 illustrates an exemplary data flow through a module of the computing device shown in FIG. 3, wherein the data flow depicts the classification of roadway features.

FIG. 5 depicts a data flow 500 through a module of a computing device (e.g., FM computing device 104) for generating classified features using image recognition module ("IR module") 302. In the exemplary embodiment, IR module 302 may identify and classify roadway features depicted in localized HD images 402 and HD point cloud 406. IR module 302 may receive localized HD images 402, wherein localized HD images 402 comprises HD photos 516 and location data 518, and feature attribute data 518 and may generate classified features 404. IR module may further receive HD point cloud 406. IR module 302 is in communication with other modules of feature mapping computing device ("FM computing device") 104, such as photogrammetry module 304 and map generation module ("MG module") 306 (both shown in FIG. 4), and is configured to transfer classified features 404 to any of the other modules. IR module 302 employs image recognition techniques through trained image recognition model ("trained IR model") 502.

In the exemplary embodiment, IR module 302 may utilize trained IR model 502 to employ image recognition techniques. Trained IR model 502 is primarily utilized for identifying roadway features depicted in localized HD images 402. IR module 302 receives localized HD images 402 and HD point cloud 406, utilizes localized HD images 402 and HD point cloud 406 as an input into trained IR model 502, and receives output identified features, such as identified features 522 and 532, from trained IR model 502. Trained IR model 502 is configured to receive inputs of a specific type and generate outputs of a specific type. Specifically, trained IR model 502 is configured to receive HD photos 516 and HD point cloud 406 as an input and generate identified features, such as identified features 522 and 532. Trained IR model 502 employs image recognition techniques to generate identified features based upon HD photos 516 and HD point cloud 406.

Trained IR model 502 must be 'trained' using training data 504 such that trained IR model 502 'learns' how to associate inputs and outputs. In some embodiments, the image recognition techniques utilized and trained in IR module 302 utilize supervised learning, unsupervised learning, or both. Prior to utilization by IR module 302, an un-trained IR model may receive training data 504, wherein training data 504 comprises base models 508, base images 510, manual delineations 512, and feature classifications 514. In one embodiment, base models 508 are 3D representations (e.g., an HD point cloud) of one or more driving environments that include roadway features of interest. In alternative embodiments, base models 508 may be 3D representations of one or more driving environments that do not include roadway features of interest. In another embodiment, base models 508 may be 3D representations of a non-driving environment. Base images 510 are images of one or more driving environments that include roadway features of interest. In alternative embodiments, base images 510 depict a driving environment that does not include roadway features of interest and/or depict a non-driving environment. Manual delineations 512 are manually generated indications of the roadway features in the images, such as the outlining and labeling of features. Feature classifications 514 are attributes associated with the roadway features depicted in base models 508 and/or base images 510. For example, a particular representation of base models 508 or a particular image of base images 510 may depict an intersection with a stoplight. Manual delineations 512 may include an outline of the stoplight and a label for "stoplight" associated with the outline. Feature classifications 514 may include attributes related to the stop light such as type=road sign, priority=high, motion class=static, etc. The un-trained IR model receives training data 504 and compares base models 508 and base images 510 to manual delineations 512 and feature classifications 514. Using machine learning techniques, the un-trained IR model generates a mathematical model which associates aspects in base models 508 and base images 510 with manual delineations 512 and feature classifications 514. When the mathematical model has been developed enough to allow for identification and classification of features depicted in base images 510 with no manual delineations 512 or feature classifications 514, the model is considered 'trained'. Trained IR model 502, then, utilizes a fully trained mathematical model capable of identifying and classifying features depicted in HD photos 516 and HD point cloud 406.

By employing trained IR model 502, IR module 302 may receive localized HD images 402 and HD point cloud 406 and generates classified features 404. IR module 302 may determine HD photos 516, may determine identified features 522 and 532, and may associate feature attributes 524 and 534 with identified features 522 and 532 respectively. Identified features 522 and 532 associated with feature attributes 524 and 534 constitute classified features 520 and 530 respectively. Feature attributes 524 and 534 provide additional information for identified features 522 and 532. In some embodiments, IR module 302 receives feature attribute data 506, such as via a database. IR module 302 determines feature attributes 524 and 534 for identified features 522 and 532 based upon referencing feature attribute data 506 and determining attributes from feature attribute data 506 to associate with identified features 522 and 532. In some embodiments, trained IR model 502 assigns feature attributes 524 and 534 to identified features 522 and 532 without referencing feature attribute data 506.

Attributes which may be included in feature attributes 524 and 534 include but are not limited to: ID, type, priority, motion class, feature details, and location. As discussed with regard to FIG. 3, the ID attribute refers to the identification of the feature, either using a descriptive name or a numeric code, and is determined directly by trained IR model 502. The type attribute refers to a category under which the feature falls, such as 'road sign' or 'natural landmark'. The priority attribute refers to the relative importance of the attribute with regard to AV operation. The motion class attribute refers to whether the feature is mobile or immobile. The feature details attribute refers to a variety of additional information about a feature which may be useful, such as feature color, feature wording, or AV operating parameters associated with the feature. The location attribute refers to the location of the features, either locally within the base map or absolutely (e.g., relative to the Earth). In alternative embodiments, the feature attributes 524 and 534 are determined by trained IR model 502 based upon HD photos 516, IR module 302 based upon feature attribute data 506, and/or IR module 302 based upon location data 518.

In some embodiments, IR module 302 may utilize feature attribute data 506 to determine feature attributes 524 and 534 to associate with identified features 522 and 532. Specifically, when IR module 302 receives localized HD images 402, it determines identified features 522 and 532 via trained IR model 502. IR module 302 then references feature attribute data 506 and based upon specifics of identified features 522 and 532, determines additional feature attributes 524 and 532 for identified features 522 and 532. For example, IR module 302 may determine that a feature is a "tree", reference feature attribute data 506 to find feature attributes related to the attribute ID "tree", and determine additional attributes, such as type, priority, etc, that can be associated with the "tree" feature. In an alternate embodiment, trained IR model 502 is capable of associating feature attributes 524 and 534 with identified features 522 and 532 without referencing feature attribute data 506. In some embodiments, trained IR model 502 associates a number of feature attributes 524 and 534 with identified features 522 and 532, and IR module 302 references feature attribute data 506 to determine additional feature attributes that can be associated with each feature.

In the exemplary embodiment, IR module 302 may be configured to utilize HD point cloud 406 for generating classified features 404. Specifically, IR module 302 utilizes additional data extracted from HD point cloud 406 to more accurately identify and classify roadway features depicted in localized HD images 402. IR module 302 leverages the 3D aspects of HD point cloud 406 to extract data about a driving environment which may be unclear from the 2D HD photos. For example, a stop sign depicted in an HD photo 516 may blend in to a red building positioned directly behind the stop sign as depicted in HD photo 516, and IR module 302 may have difficulty distinguishing the stop sign as an individual feature. However, the 3D representation of HD point cloud 406 may provide additional information which allows IR module 302 to distinguish the stop sign from the building behind it. In some embodiments, IR module 302 may be configured to utilize only HD images 402 for generating classified features 404.

Figure 6:
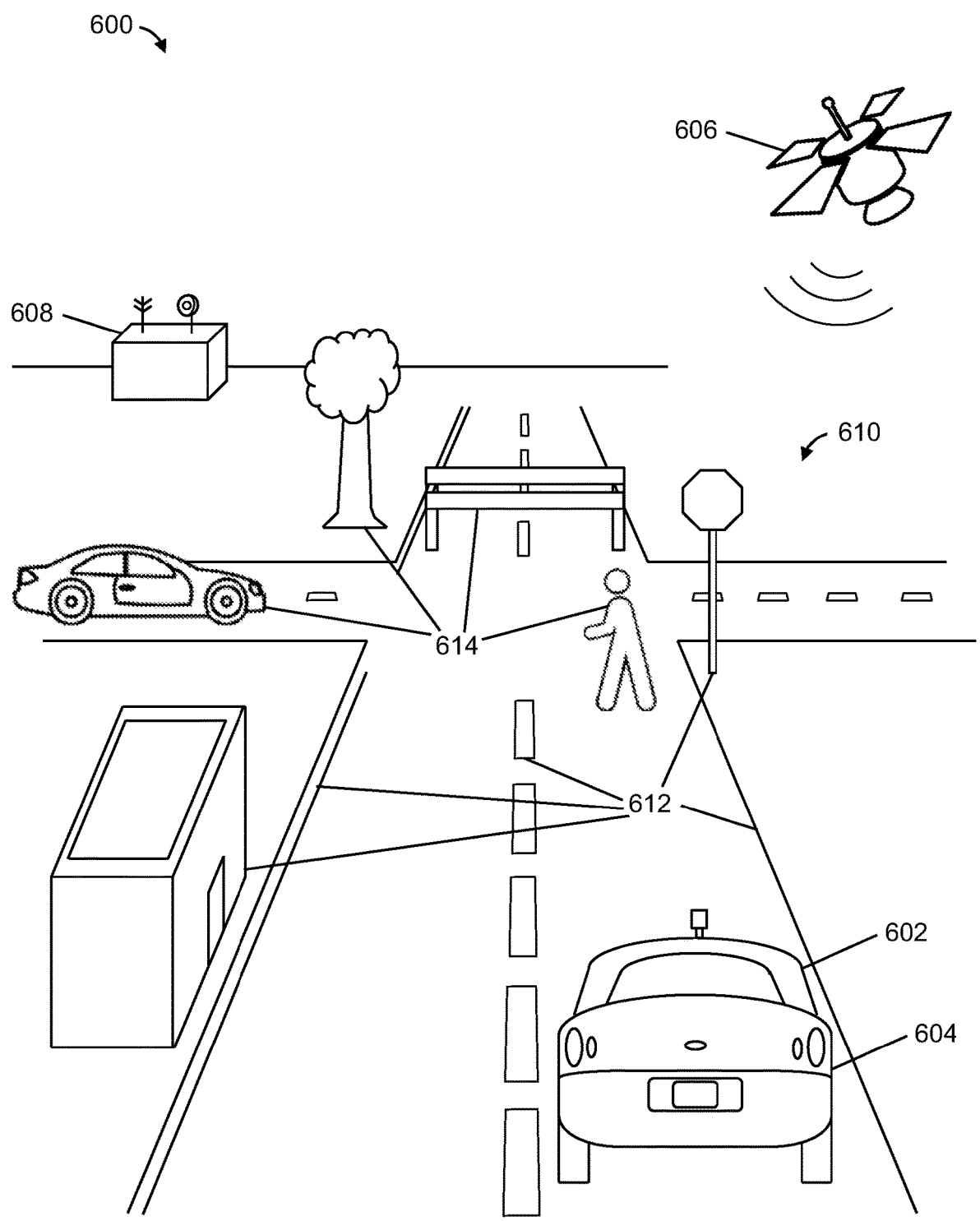
FIG. 6 illustrates an exemplary implementation of satellite-based and IMU-based localization in autonomous vehicles ("AVs"), such as the AV included in the mapping system illustrated in FIG. 1.

Exemplary Implementation of Satellite-Based and IMU-Based Localization Supported by a Base Map FIG. 6 illustrates an exemplary implementation 600 of satellite-based and IMU-based localization supported by a base map in AV operation. System 600 includes AV 602, satellite network ("satellite") 606, and base station 608. AV 602 includes base map 604, which is stored locally on AV 602. AV 602 operates within driving environment 610, which includes mapped roadway features ("mapped features") 612 and unmapped roadway features ("unmapped features") 614. Mapped features 612 are roadway features which are depicted in base map 604, and unmapped features are features which are not depicted in base map 604. AV 602 further includes a receiver for receiving satellite communications from satellite 606, a transceiver for communicating with base station 608, an IMU, and environmental detection sensors such as a LIDAR scanner and image capturing device ("camera").

In the exemplary embodiment, AV 602 may travel through driving environment 610, utilizing AV operation systems to navigate safely through mapped features 612 and unmapped features 614. AV 602 may localize absolutely based upon communication with satellite 606, base station 608, and the IMU located within AV 602. In some embodiments, satellite 606 is a GNSS network. In alternative embodiments, satellite 606 is a WADGNSS network. In some embodiments, base station 608 is an RTK base station. In the exemplary embodiment, AV 602 utilizes a plurality of absolute localization techniques. AV 602 is configured to utilize RTK localization based upon communication with satellite 606 and base station 608. AV 602 is further configured to utilize WADGNSS-based localization and GNSS based localization. AV 602 is further configured to utilize IMU-based localization, especially in situations where satellite-based localization is unavailable.

In the exemplary embodiment, AV 602 may localize absolutely (e.g., determines its location relative to Earth) based upon readings from its IMU and communication with satellite 606 and base station 608. Therefore, AV 602 is able to localize relative to mapped features 612 using base map 604. In other words, mapped features 612 are localized absolutely within base map 604, AV 602 localizes absolutely using one of the techniques described above, and AV 602 determines its location relative to mapped features 612 by comparing its absolute location to the absolute locations of mapped features 612 included in base map 604. For example, AV 602 may determine, based upon RTK localization, that its current location is latitude=X, longitude=Y (X,Y). AV 602 may then reference base map 604 to determine that a mapped feature 612, such as a stop sign, is located at latitude A, longitude B (A,B). AV 602 may then calculate the distance to the stop sign based upon the distance from (X,Y) to (A,B) (e.g., the distance between the two locations). As a further example, AV 602 may determine its current velocity and acceleration by referencing its IMU. AV 602 may then be able to determine the velocity and acceleration at which it is approaching the stop sign, and take appropriate action if its approaching the stop sign at too fast a rate. In summary, AV 602 localizes absolutely using satellite-based or IMU-based localization, and localizes relative to mapped features 612 by referencing base map 604.

In the exemplary embodiment, AV 602 may localize absolutely using satellite-based or IMU-based techniques, localizes relative to mapped features 612 by referencing base map 604, but is unable to localize relative to unmapped features 614 using any of the above methods. AV 602, therefore, utilizes LIDAR-based or environment-detection-based localization techniques to localize relative to unmapped features 614. In some embodiments, AV 602 utilizes SLAM techniques to localize relative to unmapped features 614. Localization relative to unmapped features 614 is described in more detail below.

In the exemplary embodiment, base map 604 is similar to base map 408 in that it includes data from classified features such as classified features 404 and an HD point cloud such as HD point cloud 406 (shown in FIG. 4). Base map 604, then, includes a high-resolution 3D representation of driving environment 610 and mapped features 612. Further, base map 604 includes information related to the feature attributes of mapped features 612.

In the exemplary embodiment, AV 602 may leverage the HD point cloud data and classified features data to operate more effectively. AV 602 may access base map 604, including feature attributes associated with mapped features 612. In one embodiment, AV 602 alters its operation functions based upon the feature attributes of mapped features 612. For example, AV 602 may localize relative to mapped features 612 (as described above) and further determine that an approaching mapped object is a stop sign. AV 602 may further determine, based upon feature attribute data, that within 100 feet of the stop sign, the AV operating parameter suggests reducing speed to a stop. AV 602 may therefore reduce its speed based upon the feature attribute data associated with the stop sign. In another embodiment, AV 602 alters its processing functions based upon feature attribute data. For example, AV 602 may localize relative to mapped features 612 (as described above) and further access feature attributes for a plurality of approaching mapped features 612. AV 602 may determine that a number of the features have a priority of "low" and that one of the features has a priority of "high". AV 602 may then allocate a higher percentage of processing power to monitoring the approaching "high" priority mapped features 612 AV and a lower percentage of processing power to monitoring the approaching "low" priority mapped features 612. In another example, AV 602 may allocate a higher percentage of processing power to monitoring unmapped features 614 via LIDAR or image capturing sensors. In other words, by determining that certain mapped features are "low" priority, additional processing power can be allocated to the dynamic, high priority features, both mapped and unmapped.

Figure 7:
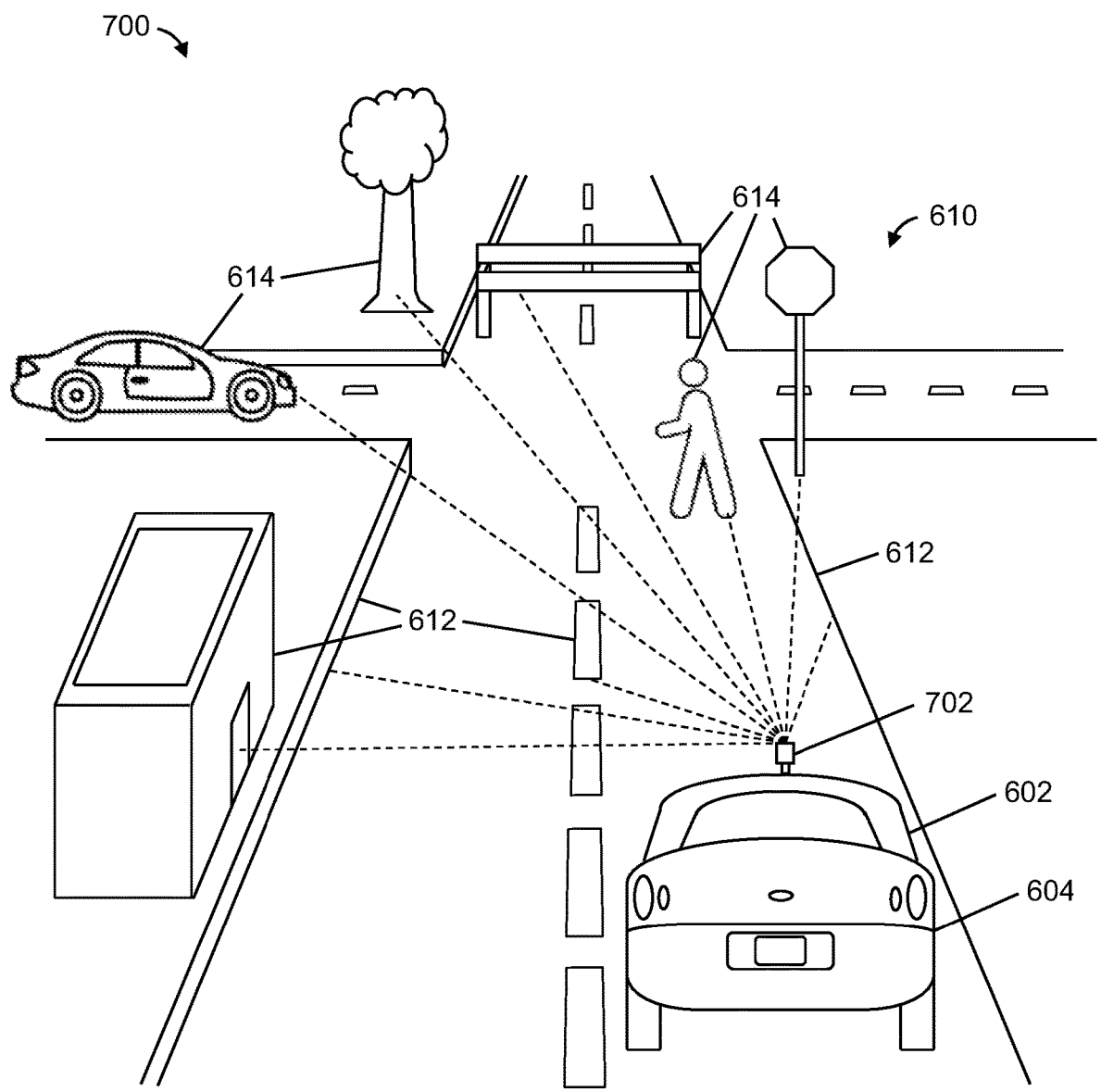
FIG. 7 illustrates an exemplary implementation of environment-detection-based localization in AVs, such as the AV included in the mapping system illustrated in FIG. 1.

Exemplary Implementation of Environment-Detection-Based Localization Supported by a Base Map FIG. 7 illustrates an exemplary implementation 700 of environment-detection-based localization supported by a base map in AV operation. System 700 includes AV 602 traversing driving environment 610. Driving environment 610 includes mapped roadway features ("mapped features") 612 and unmapped roadway features ("unmapped features") 614. AV 602 includes base map 604, which is stored locally, and environment detection device ("camera") 702. Camera 702 may include LIDAR, radar, sonar, photo, video, or any other sensing capability which allows for detection of the external environment.

In the exemplary embodiment, AV 602 may traverse driving environment 610 and safely navigates through mapped features 612 and unmapped features 614 by detecting the features with camera 702 and localizing relative to the features. AV 602 localizes absolutely (e.g., relative to the Earth and/or base map 604) by referencing base map 604. Specifically, AV 602 localizes relative to mapped features 612, references base map 604 to determine the absolute locations of mapped objects 612, and subsequently localizes itself absolutely based upon its relative location to the absolutely localized mapped features 612. In other words, by determining its relative location to an absolutely localized feature, AV 602 can determine its absolute location. In the example embodiment, AV 602 utilizes absolute localization for AV navigation, tracking the path of a trip, determining position, velocity, and acceleration, and/or determining approaching mapped features 612.

In the exemplary embodiment, AV 602 may utilize camera 702 to implement simultaneous localization and mapping ("SLAM") techniques for localizing relative to both mapped features 612 and unmapped features 614. In alternative embodiments, AV 602 utilizes LIDAR-based, sonar-based, photo-based, and/or video-based SLAM techniques. In one embodiment, AV 602 utilizes photogrammetry to effectively implement photo-based and/or video-based SLAM techniques.

AV 602 may utilize SLAM techniques in order to localize relative to both mapped features 612 and unmapped features 614 in real-time, regardless of whether or not AV 602 has access to satellite-based or IMU-based localization techniques. Specifically, AV 602 uses camera 702 to localize relative to features within driving environment 610. Therefore, AV 602 is able to navigate safely through driving environment 610. As discussed above, AV 602 can also reference base map 604 and localize absolutely based upon its relative localization to mapped features 612. While AV 602 is able to navigate using SLAM techniques without obtaining absolute localization, absolute localization provides a number of enhancements for AV operation. In one embodiment, AV 602 determines its absolute location by referencing base map 604. Subsequently, AV 602 determines upcoming mapped features 612 which are not yet detectable by camera 702 and implements certain operation parameters prior to reaching the undetected mapped features 612. For example, AV 602 may be planning to turn right on a city street and may determine, by referencing base map 604, that AV 602 will encounter a cross walk shortly after turning. As such, AV 602 may reduce speed during the turn and/or accelerate more slowly after making the turn. Had AV 602 been relying solely on a SLAM interface for relative localization, it would not have anticipated the cross-walk until at least partially through the turn, thus allowing for less time to take operation-based safety precautions.

In one embodiment, AV 602 utilizes SLAM techniques to generate a 3D rendering of the surrounding environment. In the exemplary embodiment, the 3D rendering may be a point cloud comprising data points oriented in a 3D space. In the exemplary embodiment, AV 602 may access a stored base map and compare data points in the generated point cloud to data points in the base map. Specifically, AV 602 may be localized absolutely and may access a base map corresponding to its current location. It may then utilize SLAM techniques to generate a point cloud of its surrounding environment based on sensor data, and it may compare the point cloud of its surrounding environment to the base map. For example, AV 602 may compare data points in its generated point cloud to points in the base map and determine that the set of points matches, say, in a case where the points represent a tree or a building. In another example, AV 602 may compare data points in its generated point cloud to points in the base map and determine that points in the environment do not match points in the base map, say, in a case where a car is in the surrounding environment, but not in the base map. AV 602, then, is able to more easily recognize roadway features which are dynamic (e.g., not part of the base map) as opposed to static (e.g., part of the base map).

In the exemplary embodiment, AV 602 may utilize photo-based or video-based SLAM techniques ("camera-based SLAM techniques") such that the color and/or wording of roadway features are detected. AV 602 may utilize camera 702 to capture images of driving environment 610, employ image recognition and photogrammetry to localize relative to mapped features 612 and unmapped features 614, and reference base map 604 to localize absolutely. By utilizing camera-based SLAM techniques, AV 602 has access to color and wording data which can be used to identify mapped features 612 in base map 604 more quickly and/or accurately. In other words, since base map 604 contains information about the color and wording of mapped features 612, AV 602 utilizes captured information on the color and wording of nearby features to identify those features more quickly and accurately in the base map. For example, in a rural environment, a road transition from roadway to dirt may be difficult to detect using a typical LIDAR scanner, which does not detect color. However, using camera-based SLAM techniques, AV 602 may detect the color transition from road to dirt, thereby more accurately determining the location of the road transition. In addition, AV 602 may reference base map 604 and determine a road transition is approaching and further determine that the road transition corresponds to a specific color transition. AV 602 may utilize camera 702 to detect the color transition and thereby accurately localize AV 602 relative to the base map. As another example, AV 602 may use camera 702 to detect lane markings, such as lane lines, which may be more easily detected using camera-based SLAM techniques. By localizing relative to the lane lines, AV 602 is able to maintain a desired position within its lane.

Exemplary Rendering of Slam Prioritization Using a Base Map

Figure 8:
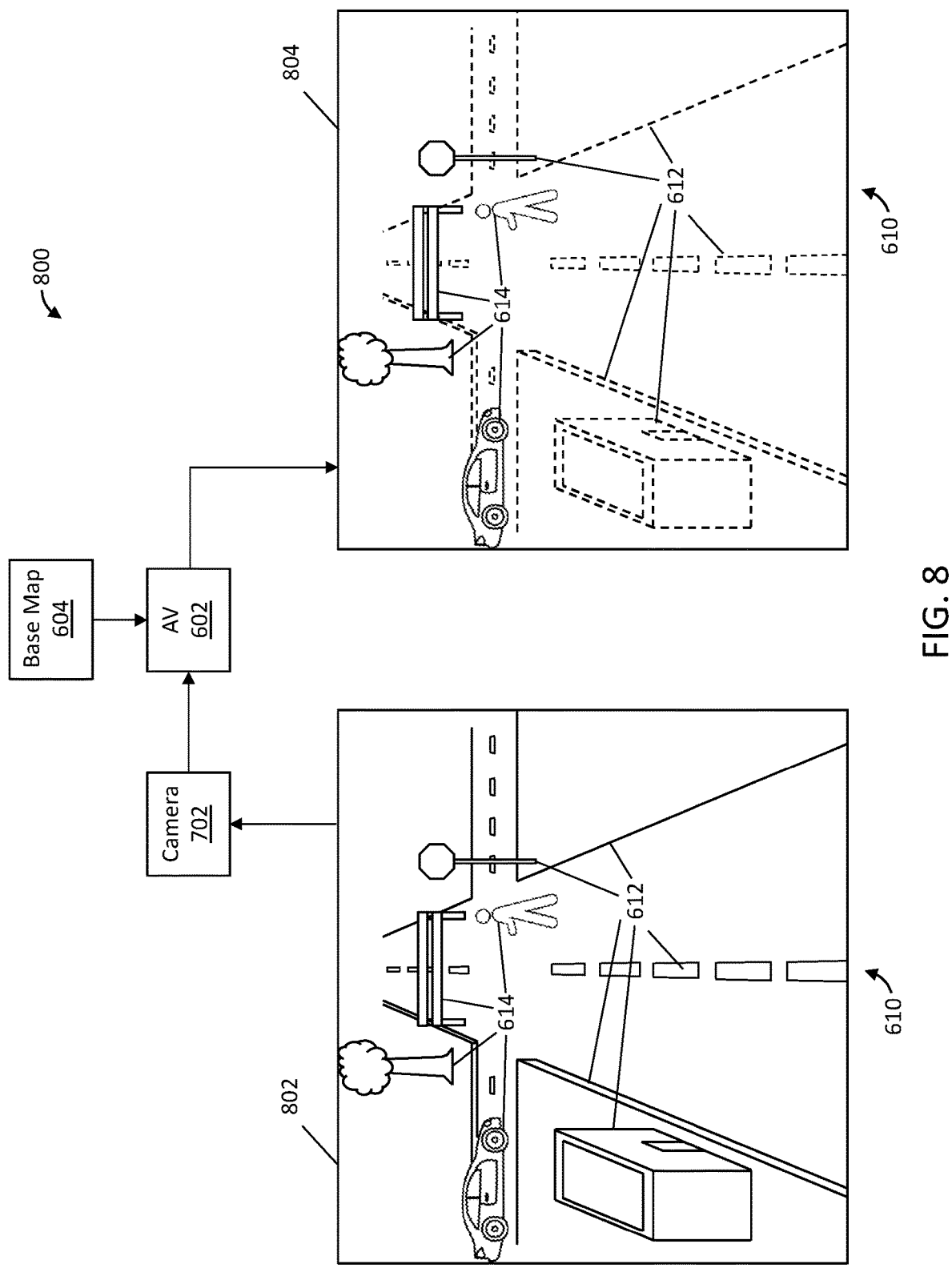
FIG. 8 illustrates an exemplary depiction of simultaneous localization and mapping ("SLAM") prioritization in an AV, such as the AV included in the mapping system illustrated in FIG. 1.

FIG. 8 illustrates an exemplary depiction 800 of SLAM prioritization using a base map. System 800 includes AV 602, which includes camera 702 and base map 604. Camera 702 captures real-world image 802 of driving environment 610, wherein driving environment 610 includes mapped features 612 and unmapped features 614. AV 602 receives real-world image 802 and data from base map 604 and determines the features for which the most processing power should be allocated, represented by SLAM prioritization image 804. Real-world image 802 represents the information that is captured by camera 702, while SLAM prioritization image 804 represents the features which are deemed high-priority for SLAM processing (solid lines) and the features which are deemed low-priority for SLAM processing (dashed lines).

In the exemplary embodiment, AV 602 may employ a variety of localization techniques, such as satellite-based, IMU-based, and environment-detection-based techniques, to localize absolutely and/or relative to features in driving environment 610. AV 602 utilizes these techniques seamlessly to provide optimal AV performance in a given situation. AV 602 further includes base map 604 which provides information to AV 602 about mapped features 612 in driving environment 610. When AV 602 is localized absolutely, it can leverage the information contained in base map 604 to improve autonomous operation.

AV 602 may utilize SLAM techniques to localize relative to features in driving environment 610 in real-time. Using camera 702, AV 602 captures information about driving environment 610. In many cases, driving environment 610 includes a large number of roadway features, many of which may be dynamic, high-priority features, so implementing SLAM techniques requires a large amount of processing power. In order to reduce the amount of power required for implementing SLAM techniques, AV 602 references base map 604 and determines which features in driving environment 610 are mapped features 612 and which features are unmapped features 614. AV 602 may further determine, based upon feature attributes contained in base map 604, the priorities of mapped features 612. AV 602, having determined which features in driving environment 610 are unmapped features 614 and/or high-priority mapped features 612, allocates more processing power to monitoring the unmapped features 614 and/or high-priority mapped features 612 with SLAM techniques. For example, AV 602 may detect a variety of features in driving environment 610, such as lane markings, a building, a stop sign, a pedestrian, a construction barrier, and a vehicle. AV 602 may then reference base map 604 and determine that the building, stop sign, and lane markings are mapped features 612, and the pedestrian, construction barrier, and vehicle are unmapped features 614. Further, AV 602 may then determine the priority of mapped features 614 and determine that the lane markings and building have low priority while the stop sign has high priority. AV 602 may then allocate a higher percentage of processing power to monitor the vehicle, pedestrian, construction barrier, and stop sign with SLAM techniques.

Exemplary Base Map Generation System

Figure 9:
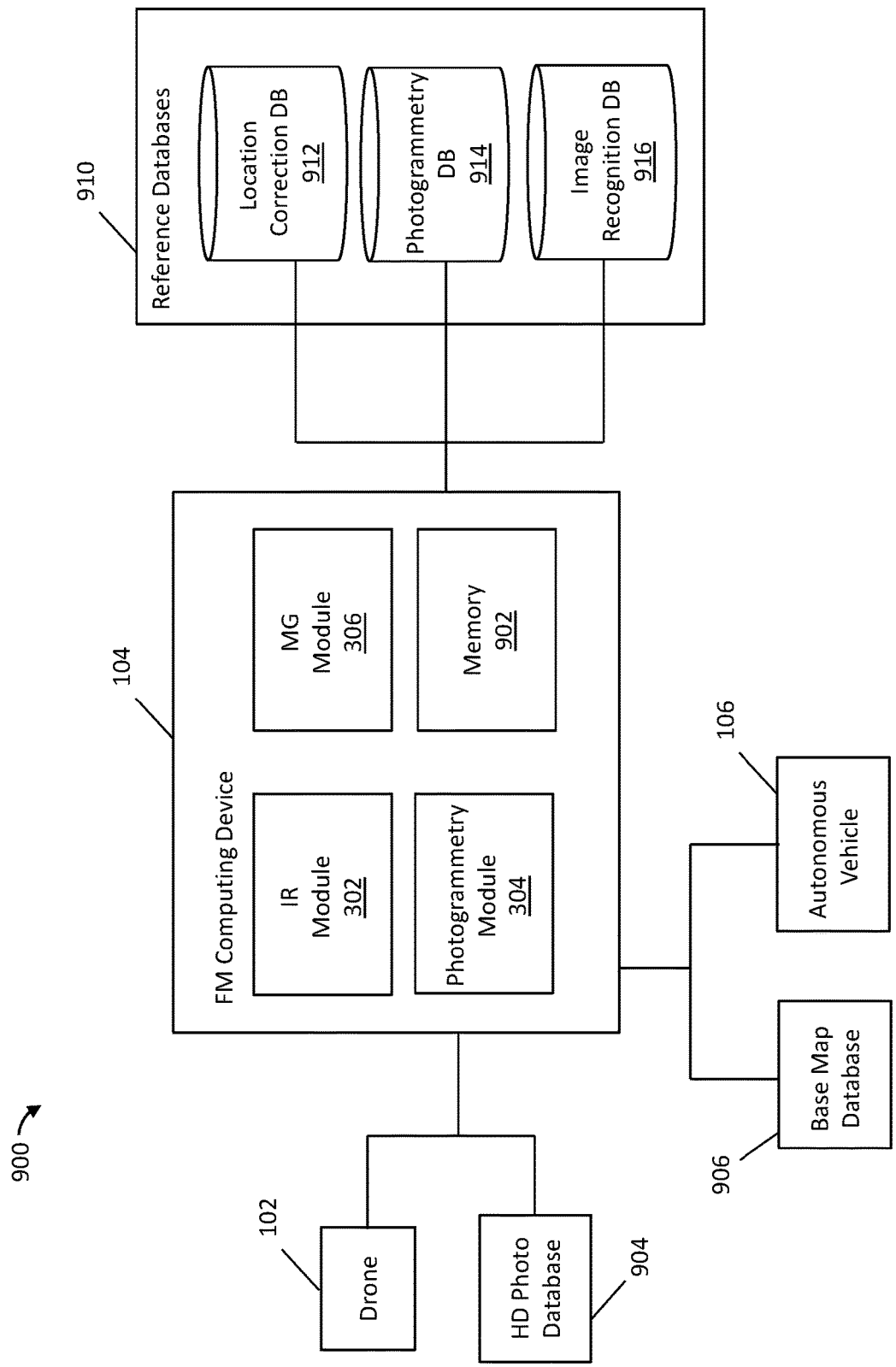
FIG. 9 illustrates an exemplary base map generation system, such as the mapping system illustrated in FIG. 1.

FIG. 9 illustrates an exemplary base map generation system 900. Base map generation system 900 includes FM computing device 104 in communication with drone 102, autonomous vehicle 106, HD photo database 904, base map database 906, and reference databases 910. Reference databases 910 include location correction database 912, photogrammetry database 914, and image recognition database 916. FM computing device includes image recognition module ("IR module") 302, photogrammetry module 304, map generation module ("MG module") 306, and memory 902.

FM computing device 104 may be configured to receive localized HD images from drone 102, wherein localized HD images comprise HD photos captured of a driving environment, location data associated with the HD photos, and camera orientation data associated with the HD photos. Alternatively, FM computing device 104 may retrieve localized HD images from HD photo database 904. Drone 102 is configured to store HD photos in HD photo database 904. In some embodiments, the location data associated with the HD photos is inaccurate and may require the application of a location correction factor to meet certain accuracy standards. In such cases, FM computing device 104 and/or drone 102 retrieves location correction factors from location correction database 912 and applies the correction factors to the location data.

FM computing device 104 may be configured to receive localized HD images and process the images using image recognition and photogrammetry, through IR module 302 and photogrammetry module 304 respectively. Further, FM computing device 104 is configured to generate a base map using MG module 306. IR module 302 implements image recognition techniques to identify roadway features depicted in the HD photos. IR module 302 also classifies the roadway features and generates classified features. Photogrammetry module 304 implements photogrammetry techniques to generate an HD point cloud (e.g., a high resolution 3D representation) of the driving environment and roadway features depicted in HD photos. MG module 306 receives the classified features and HD point cloud and generates a base map by overlaying the classified features onto the HD point cloud. MG module 306 further processes the base map to optimize it for use in AV operation. FM computing device stores the classified features, HD point cloud, and base map in memory 902, which is accessible by IR module 302, photogrammetry module 304, and MG module 306. FM computing device transfers the base map to autonomous vehicle 106 and/or base map database 906.

In some embodiments, FM computing device may retrieve data from photogrammetry database 914 and/or image recognition database 916 for use in IR module 302 or photogrammetry module 304. Image recognition database 916 includes feature attribute data which IR module 302 may associate with identified features. Further image recognition database 916 includes training data used by IR module 302 to train a mathematical model for identifying roadway features. Photogrammetry database 914 contains data necessary for implementing photogrammetry techniques, such as formulas for comparing vectors and/or determining image points.

Exemplary Computer-Implemented Method for Generating a Base Map

Figure 10:
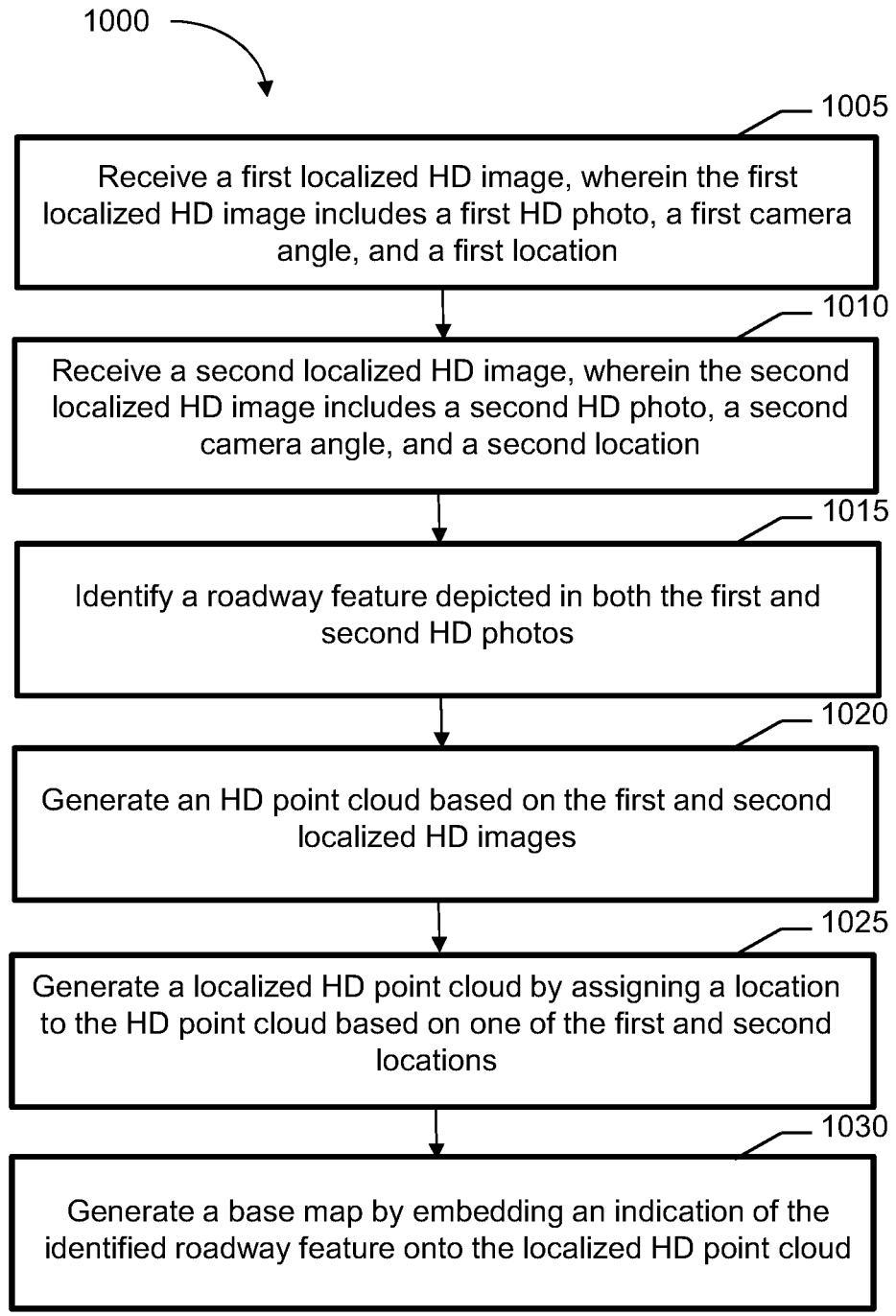
FIG. 10 illustrates an exemplary computer-implemented method for generating a base map, such as the method employed by a computing device included in the mapping system of FIG. 1.

FIG. 10 depicts a flow chart 1000 illustrating a computer-implemented method for generating a base map. In the exemplary embodiment, the computer-implemented method illustrated in flow chart 1000 is implemented by a computing device such as FA computing device 104 (shown in FIG. 9).

In the exemplary embodiment, FA computing device 104 receives 1005 a first localized HD image, wherein the first localized HD image includes a first HD photo, a first camera angle, and a first location. FA computing device 104 further receives 1010 a second localized HD image, wherein the second localized HD image includes a second HD photo, a second camera angle, and a second location, wherein the second location is different from the first location.

FA computing device 104, using an image recognition module ("IR module"), such as IR module 302 (shown in FIG. 9), identifies 1015 a roadway feature depicted in both the first and second HD photos. Using a photogrammetry module, such as photogrammetry module 304 (shown in FIG. 9), generates 1020 an HD point cloud based upon the first and second localized HD images. Specifically, photogrammetry module 304 generates 1020 an HD point cloud based upon the first and second HD photos, first and second camera angles, and first and second locations. FA computing device 104 further generates 1025 a localized HD point cloud by assigning a location to the HD point cloud based upon one of the first and second locations. FA computing device 104 subsequently generates 1030 a base map by embedding an indication of the identified roadway feature onto the localized HD point cloud.

Exemplary Computer Device

Figure 11:
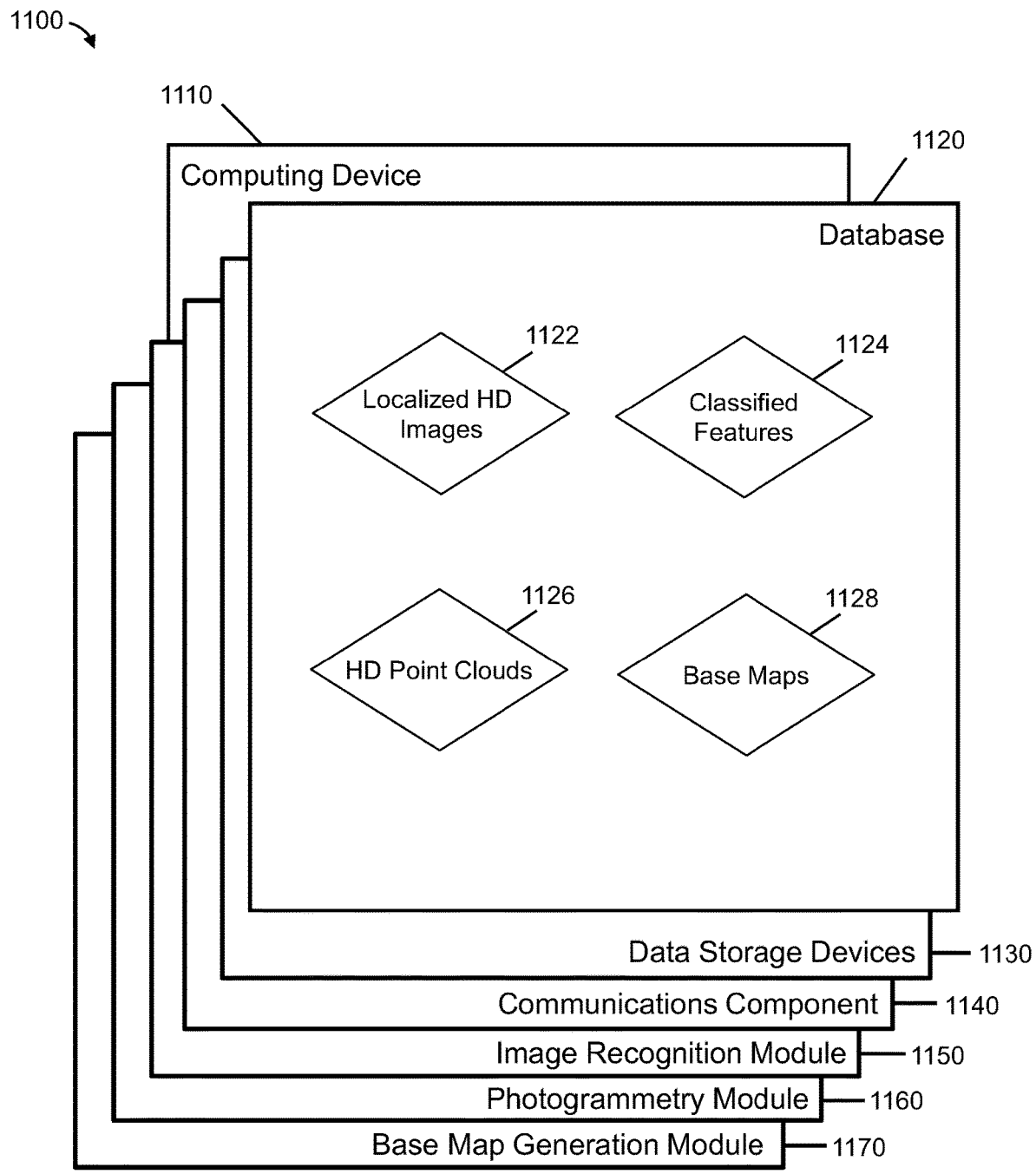
FIG. 11 illustrates an exemplary computing device for implementing the method described in FIG. 10.

FIG. 11 depicts a diagram 1100 of components of one or more exemplary computing devices 1110 that may be used in system 900 shown in FIG. 9. In some embodiments, computing device 1110 may be similar to FA computer device 104. Database 1120 may be coupled with several separate components within computing device 1110, which perform specific tasks. In this embodiment, database 1120 may include localized HD images 1122, classified features 1124, HD point clouds 1126, and base maps 1128. In some embodiments, database 1120 is similar to memory 902 (shown in FIG. 9).

Computing device 1110 may include the database 1120, as well as data storage devices 1130. Computing device 1110 may also include a communication component 1140 for receiving 1005, 1010 localized HD images (shown in FIG. 10). Computing device 1110 may further include an image recognition module ("IR module") 1150 for identifying 1015 the plurality of images (shown in FIG. 10). Further, computing device 1110 may include a photogrammetry module 1160 for generating 1020 an HD point cloud based upon localized HM images (shown in FIG. 10). Moreover, computing device 1110 further includes a base map generation module 1170 for generating 1025 a localized HD point cloud and for further generating 1030 a base map (both shown in FIG. 10).

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing— either individually or in combination. The machine learning programs may also include natural language processing, semantic analysis, automatic reasoning, and/or other types of machine learning or artificial intelligence.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about driving environments, roadway features, roadway feature attributes, HD point clouds, image locations, drone locations, and camera angles.

Based upon these analyses, the processing element may learn how to identify characteristics and patterns that may then be applied to analyzing image data, model data, and/or other data. For example, the processing element may learn, with the user's permission or affirmative consent, to identify roadway features and assign feature attributes to those roadway features.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, e.g., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A feature mapping computer system for generating an enhanced base map, the feature mapping computer system including at least one processor in communication with at least one memory device, wherein the at least one processor is configured to:
    receive a localized image including a photo depicting a driving environment and location data associated with the photo;
    identify, using an image recognition module, a roadway feature depicted in the photo;
    generate, using a photogrammetry module, a point cloud based upon the photo and the location data, wherein the point cloud comprises a set of data points representing the driving environment in a three dimensional ("3D") space;
    localize the point cloud by assigning a location to the point cloud based upon the location data;
    determine a priority for each of the set of data points based upon a relevance of each point in accurately depicting the identified roadway feature; and
    generate, based upon the determined priority, the enhanced base map that includes the identified roadway feature.

2. The feature mapping computer system of claim 1, wherein the at least one processor is further configured to embed an indication of the identified roadway feature onto the localized point cloud.

3. The feature mapping computer system of claim 1, wherein the at least one processor is further configured to:
    determine a feature attribute associated with the identified roadway feature, wherein the identified roadway feature is a road sign, and wherein the feature attribute includes at least one of (i) a color associated with the identified roadway feature and (ii) letters or numbers associated with the identified roadway feature; and embed the feature attribute onto the localized point cloud.

4. The feature mapping computer system of claim 3, wherein the processor is further configured to:

determine the feature attribute associated with the identified roadway feature;

generate a classified roadway feature by associating the feature attribute with the identified roadway feature; and embed an indication of the classified roadway feature onto the localized point cloud.

5. The feature mapping computer system of claim 1, wherein the processor is further configured to:

identify, using the image recognition module, a second roadway feature depicted in the photo;

determine a feature attribute associated with the second identified roadway feature; and determine that the second identified roadway feature is to be omitted from the enhanced base map.

6. The feature mapping computer system of claim 1, wherein the processor is further configured to:

receive another localized image including another photo depicting another driving environment and location data associated with the other photo; and identify, using the image recognition module, an additional roadway feature depicted in both of the received photos.

7. The feature mapping computer system of claim 6, wherein the location data includes a location associated with each photo, and wherein the processor is further configured to:

receive a location correction factor from a database; and determine a corrected location by applying the location correction factor to the locations associated with each photo.

8. The feature mapping computer system of claim 1, wherein the photos are aerial images captured by a drone, wherein the photos are high-definition ("HD") photos, and wherein the processor is further configured to:

determine a plurality of data points in the point cloud that represent the identified roadway feature; and remove, from the point cloud, the data points which are determined to be below a certain priority threshold.

9. The feature mapping computer system of claim 1, wherein the processor is further configured to:

transmit the enhanced base map to an autonomous vehicle system, wherein the enhanced base map is configured to be used by the autonomous vehicle system for localizing an autonomous vehicle in a driving environment of the autonomous vehicle.

10. The feature mapping computer system of claim 9, wherein the set of data points of the enhanced base map are compared with data points generated by the autonomous vehicle system to facilitate navigation of the autonomous vehicle.

11. The feature mapping computer system of claim 10, wherein the processor is further configured to:

identify, using the image recognition module, an additional roadway feature represented in the point cloud, and wherein the autonomous vehicle system, utilizing the enhanced base map, navigates the autonomous vehicle based upon the additional identified roadway feature.

12. A computer implemented method for generating an enhanced base map, the method implemented by a computer system including at least one processor, the method comprising:

receiving a localized image including a photo depicting a driving environment and location data associated with the photo;

identifying, using an image recognition module, a roadway feature depicted in the photo;

generating, using a photogrammetry module, a point cloud based upon the photo and the location data, wherein the point cloud comprises a set of data points representing the driving environment in a three dimensional ("3D") space;

localizing the point cloud by assigning a location to the point cloud based upon the location data;

determining a priority for each of the set of data points based upon a relevance of each point in accurately depicting the identified roadway feature; and generating, based upon the determined priority, the enhanced base map that includes the identified roadway feature.

13. The computer implemented method of claim 12, wherein generating the enhanced base map that includes the identified roadway feature includes:

embedding an indication of the identified roadway feature onto the localized point cloud.

14. The computer implemented method of claim 12, wherein the method further comprises:

determining a feature attribute associated with the identified roadway feature, wherein the identified roadway feature is a road sign, and wherein the feature attribute includes at least one of (i) a color associated with the identified roadway feature and (ii) letters or numbers associated with the identified roadway feature; and embedding the feature attribute onto the localized point cloud.

15. The computer implemented method of claim 14, wherein the method further comprises:

determining the feature attribute associated with the identified roadway feature;

generating a classified roadway feature by associating the feature attribute with the identified roadway feature; and embedding an indication of the classified roadway feature onto the localized point cloud.

16. The computer implemented method of claim 12, wherein the method further comprises:

identifying, using the image recognition module, a second roadway feature depicted in the photo;

determining a feature attribute associated with the second identified roadway feature; and determining that the second identified roadway feature is to be omitted from the enhanced base map.

17. The computer implemented method of claim 12, wherein the method further comprises:

determining a plurality of data points in the point cloud that represent the identified roadway feature; and removing, from the point cloud, the data points which are determined to be below a certain priority threshold.

18. The computer implemented method of claim 12, wherein the method further comprises:

transmitting the enhanced base map to an autonomous vehicle system, wherein the enhanced base map is configured to be used by the autonomous vehicle system for localizing an autonomous vehicle in a driving environment of the autonomous vehicle, wherein the set of data points of the enhanced base map are compared with data points generated by the autonomous vehicle system to facilitate navigation of the autonomous vehicle.

19. The computer implemented method of claim 18, wherein the method further comprises:

identifying, using the image recognition module, an additional roadway feature represented in the point cloud, and wherein the autonomous vehicle system, utilizing the enhanced base map, navigates the autonomous vehicle based upon the additional identified roadway feature.

20. At least one non-transitory computer-readable storage medium having computer-executable instructions embodied thereon for generating an enhanced base map, wherein when executed by at least one processor, the computer-executable instructions cause the processor to:

receive a localized image including a photo depicting a driving environment and location data associated with the photo;

identify, using an image recognition module, a roadway feature depicted in the photo;

generate, using a photogrammetry module, a point cloud based upon the photo and the location data, wherein the point cloud comprises a set of data points representing the driving environment in a three dimensional ("3D") space;

localize the point cloud by assigning a location to the point cloud based upon the location data;

determine a priority for each of the set of data points based upon a relevance of each point in accurately depicting the identified roadway feature; and generate, based upon the determined priority, the enhanced base map that includes the identified roadway feature.

\* \* \* \* \*